US012673378B2

(12) United States Patent
Han et al.

(10) Patent No.: US 12,673,378 B2
(45) Date of Patent: Jul. 7, 2026

(54) SOLDERING APPARATUS INCLUDING A SHUTTERED LIGHT SOURCE

(71) Applicant: SAMSUNG ELECTRONICS CO., LTD., Suwon-si (KR)

(72) Inventors: Seongchan Han, Suwon-si (KR); Kyungdeuk Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/917,051

(22) Filed: Oct. 16, 2024

(65) Prior Publication Data

US 2025/0303487 A1 Oct. 2, 2025

(30) Foreign Application Priority Data

Mar. 27, 2024 (KR) ........................ 10-2024-0041739

(51) Int. Cl.
*B23K 3/08* (2006.01)
*B23K 1/00* (2006.01)
*B23K 101/42* (2006.01)

(52) U.S. Cl.
CPC ............ *B23K 3/085* (2013.01); *B23K 1/0008* (2013.01); *B23K 2101/42* (2018.08)

(58) Field of Classification Search
None
See application file for complete search history.

(56) References Cited

U.S. PATENT DOCUMENTS

| | | | | |
|---|---|---|---|---|
| 4,278,867 | A | * | 7/1981 | Tan ...................... B23K 26/123 |
| | | | | 219/121.64 |
| 5,358,166 | A | * | 10/1994 | Mishina ................. B23K 1/008 |
| | | | | 228/232 |
| 6,394,794 | B2 | * | 5/2002 | Bloom ...................... F27B 9/10 |
| | | | | 432/128 |
| 6,583,385 | B1 | * | 6/2003 | Sinkunas ............. B23K 1/0016 |
| | | | | 219/121.64 |
| 6,642,485 | B2 | * | 11/2003 | Goenka .................. B23K 3/087 |
| | | | | 219/400 |
| 9,114,936 | B2 | * | 8/2015 | Yokota .................. B23K 1/008 |
| 9,168,604 | B2 | * | 10/2015 | Kressmann ............ B23K 1/008 |
| 10,227,183 | B2 | * | 3/2019 | Saito ................. H01L 21/67294 |
| 10,304,797 | B2 | * | 5/2019 | Arutinov ............. H05K 3/3436 |

(Continued)

FOREIGN PATENT DOCUMENTS

| | | | | |
|---|---|---|---|---|
| EP | 3232737 | A2 | 10/2017 | |
| KR | 20090046368 | A | * 5/2009 | ........... H01L 21/268 |

(Continued)

*Primary Examiner* — Devang R Patel
(74) *Attorney, Agent, or Firm* — Morgan, Lewis & Bockius LLP

(57) ABSTRACT

A soldering apparatus includes a soldering chamber having a soldering region. A transfer actuator passes through the soldering region. The transfer actuator is configured to move a substrate on which an electronic component is disposed into and out of the soldering region. A light source is disposed in the soldering chamber and casts light toward the soldering region. A shutter is disposed between the soldering region and the light source, and opens and closes a path of the light cast from the light source toward the soldering region. A controller is connected to the transfer actuator and the shutter and controls an opening and closing operation of the shutter.

20 Claims, 18 Drawing Sheets

(56)          References Cited

U.S. PATENT DOCUMENTS

| | | | |
|---|---|---|---|
| 2021/0043478 A1 | 2/2021 | Ishimoto et al. | |
| 2022/0013377 A1 | 1/2022 | Nakamura et al. | |

FOREIGN PATENT DOCUMENTS

| | | | | | |
|---|---|---|---|---|---|
| KR | 10-2017-0141865 | A | | 12/2017 | |
| KR | 10-2019-0108007 | A | | 9/2019 | |
| KR | 20190108007 | A | * | 9/2019 | ............ H10W 72/20 |
| KR | 10-2020-0097777 | A | | 8/2020 | |
| KR | 10-2327167 | B1 | | 11/2021 | |
| KR | 20230068290 | A | * | 5/2023 | ........... H05K 3/3494 |
| WO | WO-2022210927 | A1 | * | 10/2002 | ................ G01J 5/00 |
| WO | WO-2019040629 | A1 | * | 2/2019 | ......... H05K 13/0061 |

* cited by examiner

P2

SOLDERING APPARATUS INCLUDING A SHUTTERED LIGHT SOURCE

CROSS-REFERENCE TO RELATED APPLICATION(S)

This application claims priority to Korean Patent Application No. 10-2024-0041739, filed on Mar. 27, 2024 in the Korean Intellectual Property Office, the disclosure of which is herein incorporated by reference in its entirety.

TECHNICAL FIELD

The present disclosure relates to a soldering apparatus and, more specifically, to a soldering apparatus including a shuttered light source.

DISCUSSION OF THE RELATED ART

There is an increasing demand for electronic components to be thin, light, and small. These electronic components may be mounted on printed circuit boards by a soldering process. In the soldering process, a reflow soldering process may be generally performed, but thermal damage to the electronic components and warping of the printed circuit boards by long-term exposure to a high temperature of the reflow soldering process may make it difficult to achieve desired levels of reliability and yield. In addition, during a soldering process, a large temperature gradient of heat energy received by a printed circuit board may cause soldering defects such as a tombstone defect, which may be a phenomenon in which electronic components on the printed circuit board are tilted.

SUMMARY

A soldering apparatus includes a soldering chamber having a soldering region. A transfer actuator passes through the soldering region. The transfer actuator is configured to move a substrate on which an electronic component is disposed into and out of the soldering region in a transfer direction. A light source is disposed in the soldering chamber and casts light toward the soldering region. A shutter is disposed between the soldering region and the light source, and opens and closes a path of the light cast from the light source toward the soldering region. A controller is connected to the transfer actuator and the shutter and controls an opening and closing operation of the shutter.

A soldering apparatus includes a first soldering chamber having a first soldering region. A second soldering chamber is disposed adjacent to the first soldering chamber and has a second soldering region. A transfer actuator is disposed within the first soldering region and the second soldering region. The transfer actuator is configured to move a substrate on which an electronic component is disposed into and out of the first soldering region and the second soldering region in a transfer direction. A first light source is disposed in the first soldering chamber and casts first light toward the first soldering region. A second light source is disposed in the second soldering chamber and casts second light toward the second soldering region. A first shutter is disposed between the first soldering region and the first light source, and opens and closes an irradiation path of the first light irradiated from the first light source toward the first soldering region. A second shutter is disposed between the second soldering region and the second light source, and opens or closes a path of the second light cast from the second light source toward the second soldering region. A controller is connected to the transfer actuator, the first shutter, and the second shutter, and controls an opening and closing operation of the first shutter and an opening and closing operation of the second shutter.

A soldering apparatus includes a load chamber in which a plurality of substrates on which an electronic component is disposed are loaded. At least one soldering chamber has a soldering region. A buffer chamber is disposed between the load chamber and the soldering chamber. A main shuttle transfers each of the plurality of substrates in the load chamber to the soldering chamber. An unload chamber unloads each of the plurality of substrates from the soldering chamber. A transfer actuator is disposed in the soldering chamber, passing through the soldering region, and introducing each of the plurality of substrates into and out of the soldering region in a transfer direction. A light source is disposed in the soldering chamber and casts light toward the soldering region. A shutter is disposed between the soldering region and the light source and opens and closes a path of the light cast from the light source toward the soldering region. A controller is connected to the transfer actuator and the shutter and controls an opening and closing operation of the shutter.

BRIEF DESCRIPTION OF DRAWINGS

The above and other aspects and features of the present inventive concept will be more clearly understood from the following detailed description, taken in conjunction with the accompanying drawings, in which.

DETAILED DESCRIPTION

Hereinafter, embodiments of the present inventive concept will be described with reference to the attached drawings.

Figure 1:
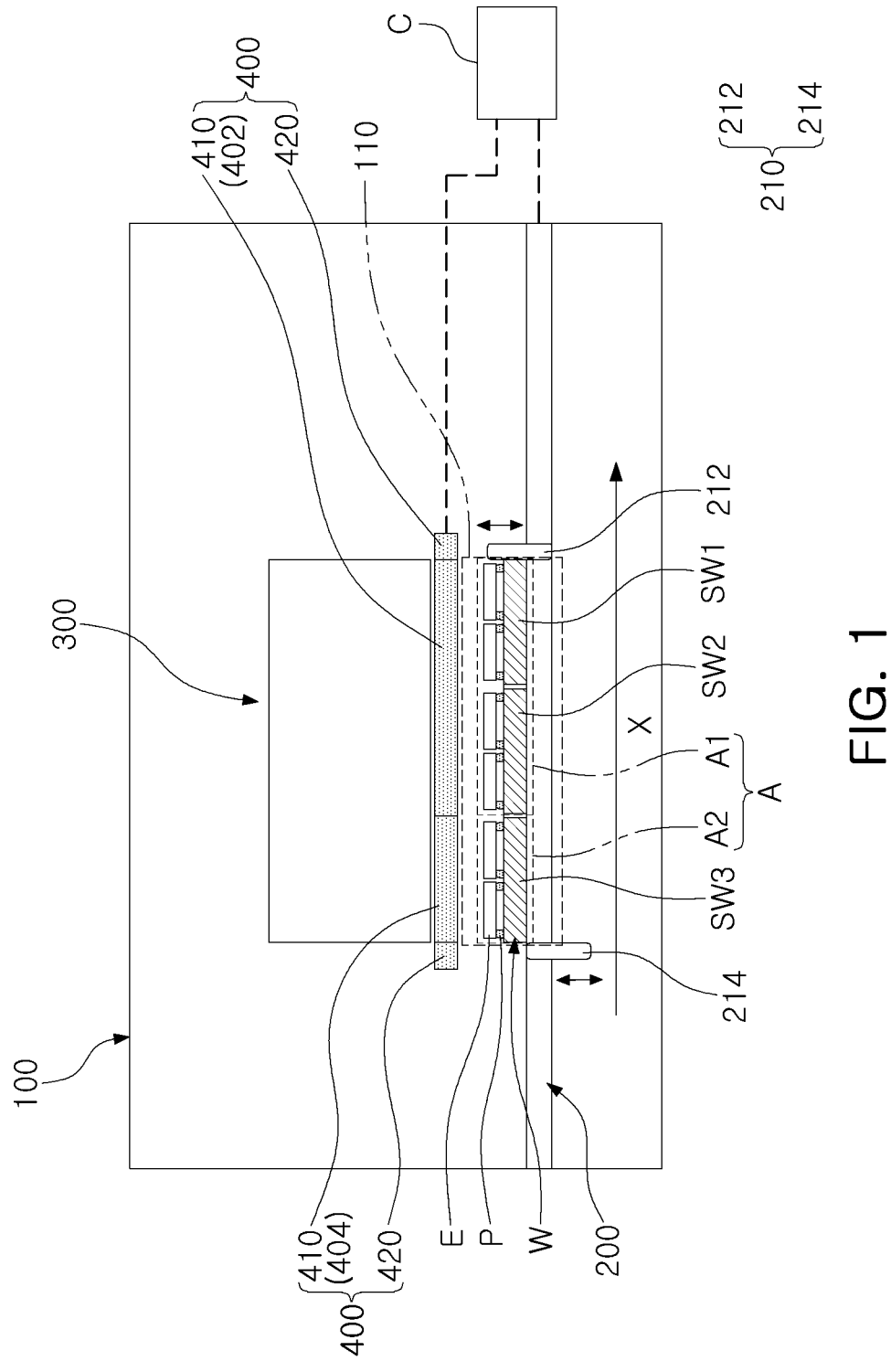
FIG. 1 is a view illustrating a soldering apparatus according to an example embodiment of the present inventive concept.
Figure 2:
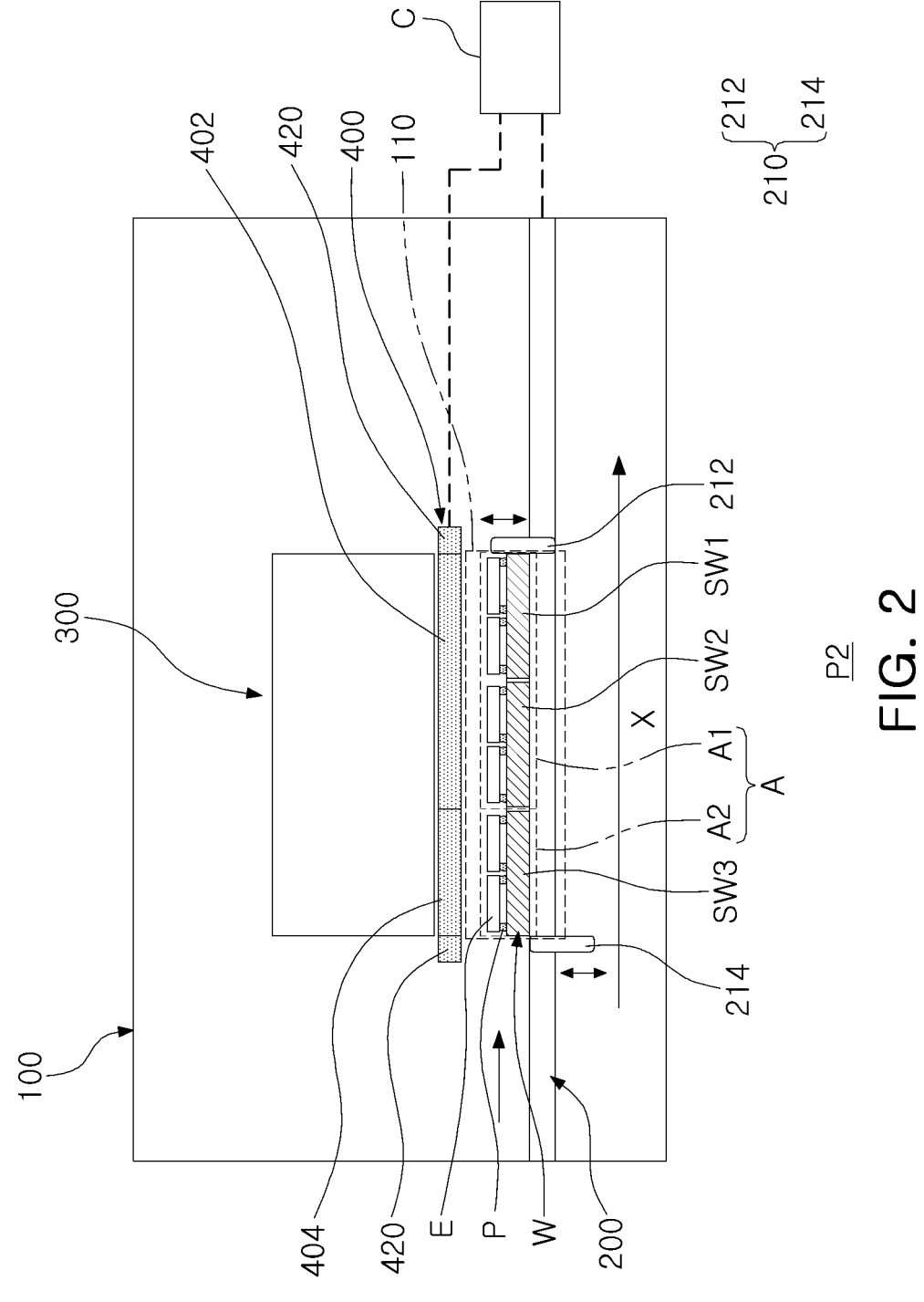
FIGS. 2 to 4 are views illustrating an operation process of the soldering apparatus of FIG. 1.
Figure 3:
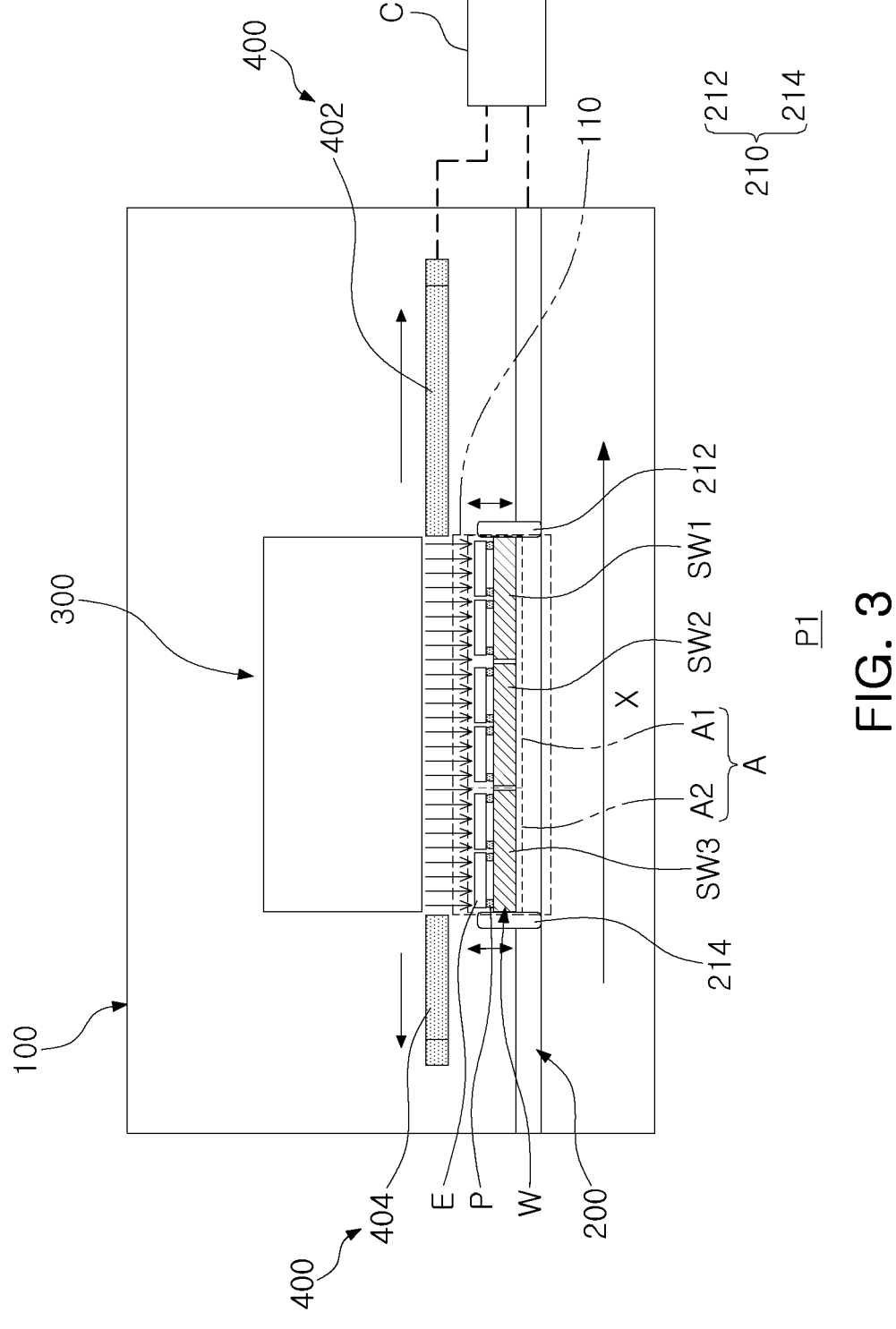
Figure 4:
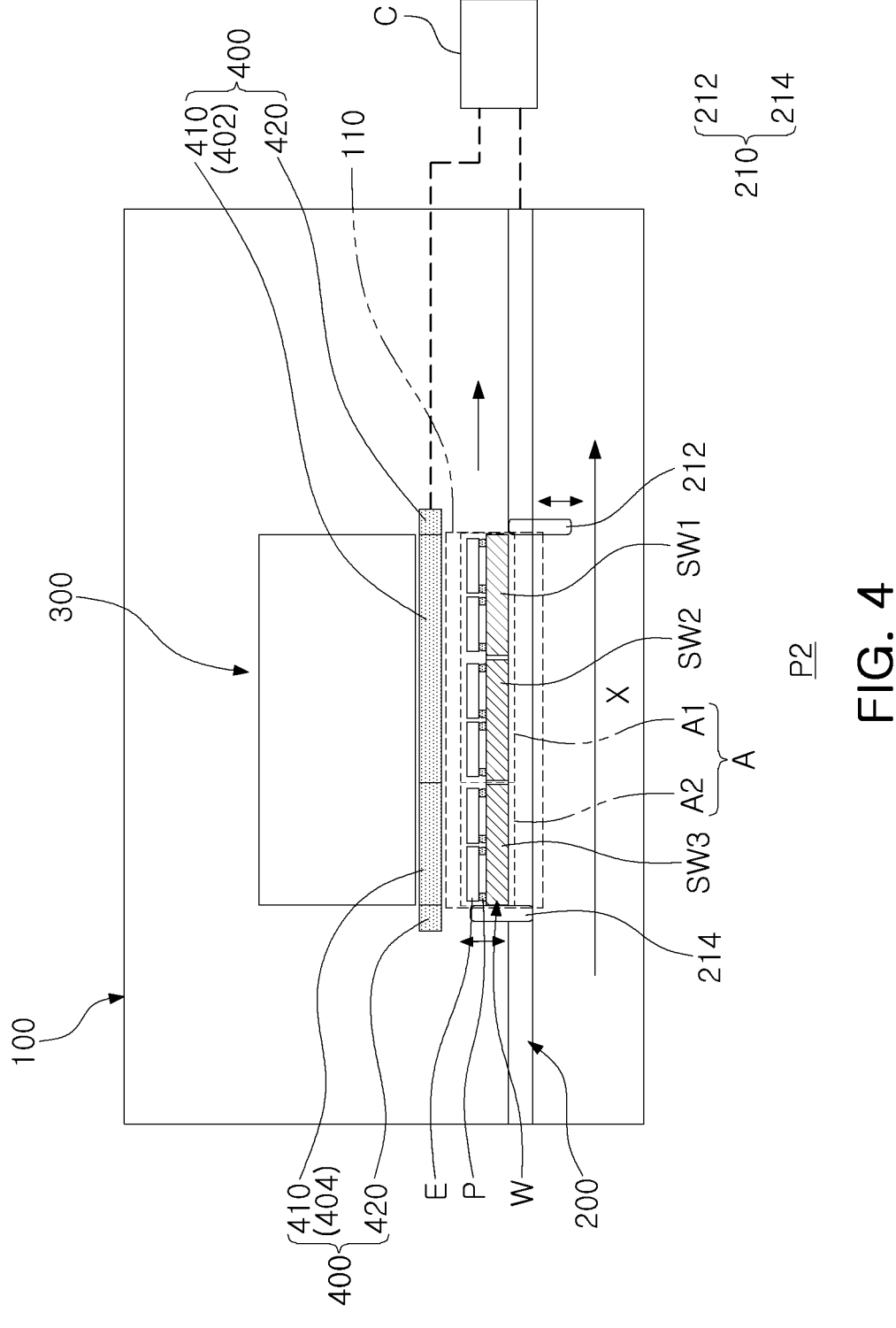
Figure 5:
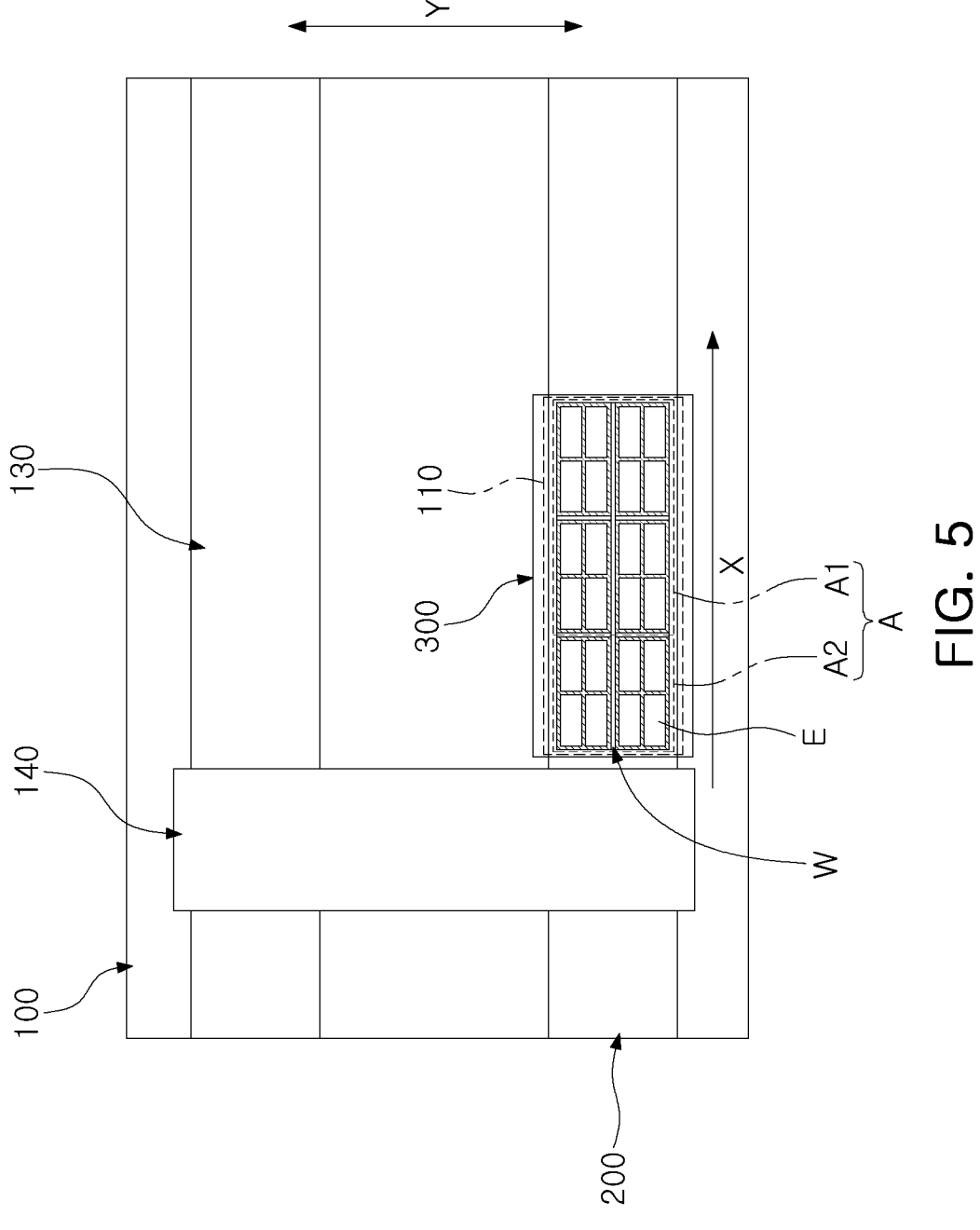
FIG. 5 is a top-down plan view of a soldering apparatus according to an example embodiment of the present inventive concept.

FIG. 1 is a view illustrating a soldering apparatus according to an example embodiment of the present inventive concept, FIGS. 2 to 4 are views illustrating an operation process of the soldering apparatus of FIG. 1, and FIG. 5 is a top-down plan view of a soldering apparatus according to an example embodiment of the present inventive concept.

Referring to FIGS. 1 to 5, a soldering apparatus, according to an example embodiment, may include a soldering chamber 100, a transfer actuator 200, a light source 300, a shutter 400, and a controller C.

The soldering chamber 100 may have a soldering region 110 in which a substrate W on which an electronic component E is disposed may be soldered using a solder paste P. As illustrated in FIGS. 1 to 5, the soldering region 110 may be singularly provided in the soldering chamber 100, but the present inventive concept is not necessarily limited thereto, and may be provided in plural in the soldering chamber 100, depending on a form of the light source 300, a size of the substrate W, arrangement of the soldering region 110, or the like, which may be described later, as needed.

In the present inventive concept, the substrate W may be a substrate having single arrangement, or a substrate having continuous arrangement in which multiple rows of individual printed circuit board portions are arranged. In an example embodiment, the substrate W may be a substrate having a single arrangement structure of 1 column and 1 row, or a continuous arrangement structure of 2 columns and 1 row, 2 columns and 2 rows, 3 columns and 1 row, 3 columns and 2 rows, 4 columns and 2 rows, 6 columns and 2 rows, or 9 columns and 2 rows. In the present embodiment, as illustrated in FIG. 1, the substrate W may have a structure in which three rows of individual printed circuit board portions SW1, SW2, and SW3 are continuously arranged in a transfer direction X of the transfer actuator 200, which will be described later, and a single individual printed circuit board or a plurality of individual printed circuit boards may be arranged in the single printed circuit board portions SW1, SW2, and SW3 of each row in a width direction Y, perpendicular to the transfer direction X. Various electronic components E may be disposed on the individual printed circuit board portions SW1, SW2, and SW3 of each row using the solder paste P. In an example embodiment, the electronic component E may be a multilayer ceramic electronic component, such as a multilayer ceramic capacitor or the like.

The transfer actuator 200 may pass through the soldering region 110 of the soldering chamber 100, and may introduce the substrate W into and out of the soldering region 110 in the transfer direction X. In an example embodiment, the transfer actuator 200 may include a conveyor passing through the soldering region 110 of the soldering chamber 100, and the substrate W may move in the transfer direction X of the conveyor while seated on the conveyor. The transfer actuator 200 is not necessarily limited to an embodiment including the conveyor, and may include various transfer means such as a transfer chain, arm, stage, or the like.

Additionally, the transfer actuator 200 may include various components that position the substrate W in the soldering region 110. In an example embodiment, the transfer actuator 200 may include a stopper 210 for locating the substrate W in a predetermined position in the soldering region 110. The stopper 210 may contact one side of the substrate W or release contact with the one side, and may bring the substrate W into a predetermined position in the soldering region 110 or release the substrate from the predetermined position in the soldering region 110. The stopper 210 may have various shapes. For example, by a lifting or lowering operation of the stopper 210, the stopper

210 may bring the substrate W into a predetermined position in the soldering region 110 in a manner contacting a front side of the substrate W in the transfer direction X of the transfer actuator 200, or release the substrate W from the predetermined position in the soldering region 110 in a manner releasing contact with the front side of the substrate W. In an example embodiment, the stopper 210 may include a first stopper 212 disposed on one side of the soldering region 110 in the transfer direction X of the transfer actuator 200, and a second stopper 214 disposed on the other side of the soldering region 110. The first stopper 212 may be disposed on a front side of the soldering region 110 in the transfer direction X of the transfer actuator 200. The second stopper 214 may be disposed on a rear side of the soldering region 110 in the transfer direction X of the transfer actuator 200. As illustrated in FIG. 2, the second stopper 214 may release the substrate W from a predetermined position, and may bring the substrate into the predetermined position in the soldering region 110 while moving the substrate W in the transfer direction of the transfer actuator 200 to contact the first stopper 212. The substrate W brought into a predetermined position in the soldering region 110 may be soldered by a light source 300 to be described later, as illustrated in FIG. 3, and may then be released from the predetermined position by the first stopper 212 and transferred from the soldering region 110 to another position through the transfer actuator 200, as illustrated in FIG. 4. The substrate W may be provided in plural and the plurality of the substrates W may be spaced apart from each other on the transfer actuator 200, and thus a continuous soldering process for the substrate W may be implemented. Through the stopper 210, positional control of the substrate W may be easily implemented with a simple structure. The present inventive concept is not necessarily limited thereto, and the transfer actuator 200 may include a position detection sensor or the like to bring the substrate W into a predetermined position in the soldering region 110, or various methods such as presetting a moving distance of the substrate W may be applied.

The light source 300 may be disposed in the soldering chamber 100, and may cast light toward the soldering region 110. The light source 300 may uniformly cast the light toward the substrate W. In an example embodiment, the light source 300 may cast microwave white light (e.g., intense pulsed light, IPL) toward the soldering region 110. The microwave white light refers to short and strong pulsed light having a wide wavelength spectrum, and light having multiple wavelengths may be cast in a large area, and may be exposed with short pulses at high intensity to heat. The light source 300 may include a xenon lamp. The light source 300 does not cause loss of light energy by directly exposing the substrate W to light, and thus soldering may be performed using light with less energy, increasing a lifespan of the light source 300. The light source 300 may use a method of constantly casting light as needed, or may use a flash lamp that turns off for a certain period of time. When light is cast from the light source 300 toward the substrate W which has been brought into a predetermined position in the soldering region 110, the light energy may be converted into heat energy, and solder paste P on the substrate W may be melted and cured to solder the electronic component E to the substrate W.

The light source 300 may cast light toward at least a portion of an entire region A of the substrate W. In an example embodiment, as illustrated in FIG. 3, the light source 300 may have a range spanning the entire region A of the substrate W. For example, since the light source 300 may cast light toward the entire region A of the substrate W that has been brought into a predetermined position in the soldering region 110 to perform soldering on the entire region A of the substrate W at once, soldering efficiency may be increased. The present inventive concept is not necessarily limited thereto, and as necessary, the entire region of the substrate may be divided into a plurality of regions to sequentially cast light, which will be described later.

In this case, the soldering chamber 100 may be provided with the shutter 400 to block light from the light source 300, before the substrate W is brought into the predetermined position in the soldering region 110 or after the soldering is completed. The shutter 400 may be disposed between the soldering region 110 and the light source 300 in the soldering chamber 100, and a path of the light from the light source 300 toward the soldering region 110 may be opened or closed. In an example embodiment, the shutter 400 may include a door 410 and a driver 420 connected to the door 410 and driving the door 410. The door 410 may have an open position P1 that opens the path of the light from the light source 300 toward the soldering region 110, and a closed position P2 that blocks the path of the light. The driver 420 may drive the door 410 such that the door 410 moves between the open position P1 and the closed position P2. The driver 420 may have various forms, and, in an example embodiment, may include a driving motor that provides power, and power transmission mechanisms that transmit the power of the driving motor to open or close the door. The door 410 may be implemented in various embodiments. In an example embodiment, the door 410 may have a plate shape, and, as necessary, may have an integrated structure or be divided into a plurality of pieces such as 2, 3, or 4 pieces, and may have a separate structure that may open or close a region corresponding thereto, among the entire region of the substrate. In an example embodiment, the door 410 may be formed of a piece or a plurality of pieces in a direction, parallel or perpendicular to the transfer direction X of the transfer actuator 200. When the door is formed of a plurality of pieces, the entire region of the substrate may be divided into a plurality of desired regions and soldered by light, as necessary, and a rapid opening or closing operation may be implemented. In an example embodiment, as illustrated in FIG. 1, the door 410 may have a plate shape separated into two pieces, and the two plates may be opened in the open position P1 at the same time, or may be closed in the closed position P2 at the same time. In an example embodiment, the shutter 400 may include a first door 402 opening or closing a first path cast toward a region A1 of an entire region A of the substrate W, in the path of the light cast from the light source 300, and a second door 404 opening or closing a second path toward a different region A2 of the entire region A of the substrate W, in the path of the light cast from the light source 300.

The controller C may be connected to the transfer actuator 200 and the shutter 400, and may control the opening or closing operation of the shutter 400. The controller C may be connected to the driver 420 of the shutter 400, and may control the driver 420 to move the door 410 between the open position P1 and the closed position P2. When the door 410 includes the first door 402 and the second door 404, having a plate form, separated into two pieces as illustrated in FIG. 1, the controller C may control the driver 420 such that the first door 402 and the second door 404 are opened simultaneously in the open position P1, as illustrated in FIG. 3, or closed simultaneously in the closed position P2, as illustrated in FIGS. 2 and 4. When the substrate W is brought into a predetermined position in the soldering region 110, the controller C may bring the first door 402 and the second door 404 of the door 410 to be in the open position P1, and when the substrate W is not brought into a predetermined position in the soldering region 110, the controller C may bring the first door 402 and the second door 404 of the door 410 to be in the closed position P2.

The present inventive concept is not necessarily limited thereto, and in an embodiment in which a region and a different region, among the entire region of the substrate, are sequentially soldered, when the door has a plate form divided into two or a plurality of pieces, each of the pieces of the shutter may be opened or closed independently to open a region to be soldered and close a remaining region among the entire region of the substrate. In other words, the controller C may open one of the first door 402 and the second door 404, and may close the other one.

Additionally, in an example embodiment, as illustrated in FIG. 5, the soldering apparatus may further include a bypass region 130 and a transfer shuttle 140. The bypass region 130 may be disposed in the soldering chamber 100, and may allow the substrate W to bypass the soldering region 110, as needed, through the transfer shuttle 140, to move the substrate W to the bypass region 130, without soldering. The transfer shuttle 140 may transfer the substrate W between the soldering region 110 and the bypass region 130.

According to a soldering apparatus including the above configuration, when the substrate W is brought into a predetermined position in the soldering region 110 in the soldering chamber 100, the first door 402 and the second door 404 of the door 410 may be opened and light may be cast uniformly toward the entire region A of the substrate W through the light source 300. Therefore, since soldering is performed while minimizing the heat energy received by the substrate W, and, furthermore, a temperature gradient does not occur in the entire region A of the substrate W, the solder pastes P of the substrate W may be simultaneously melted and the electronic components E may be soldered in the predetermined position on the substrate W, to effectively preventing occurrence of tombstone defects. In addition, a soldering apparatus of the present inventive concept may continuously solder various substrates, especially a substrate having continuous arrangement, using a batch production method, to significantly increase soldering efficiency for substrates.

In the above embodiment, it is illustrated that one soldering region is provided in the soldering chamber. The present inventive concept is not necessarily limited thereto, and a plurality of soldering regions may be provided in the soldering chamber, as needed, and a plurality of soldering regions may be arranged in the soldering chamber in at least one direction of the transfer direction or a width direction, perpendicular to the transfer direction. In this case, the light source may be disposed in each of the soldering regions. This will be described in detail below.

Figure 6:
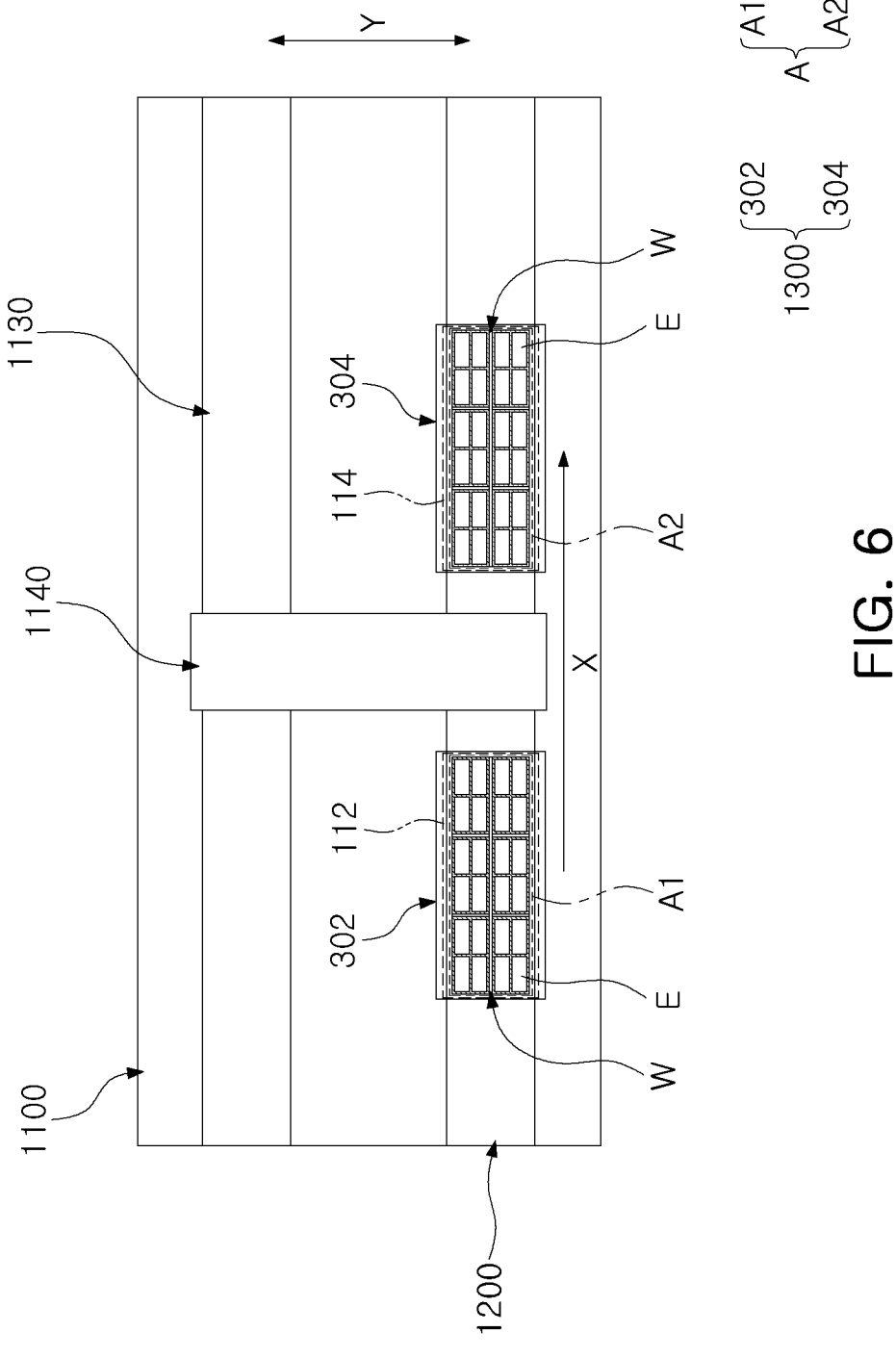
FIG. 6 is a top-down plan view of a soldering apparatus according to an example embodiment of the present inventive concept.

FIG. 6 is a top-down plan view of a soldering apparatus according to an example embodiment of the present inventive concept, and FIGS. 7 to 12 are views illustrating an operation process of the soldering apparatus of FIG. 6.

Referring to FIGS. 6 to 12, a soldering chamber 1100 may have a plurality of soldering regions disposed in a transfer direction X, and a light source 1300 may be disposed in each of the soldering regions.

In an example embodiment, the soldering chamber 1100 may include a first soldering region 112 and a second soldering region 114, arranged in the transfer direction X of a transfer actuator 1200. The light source 1300 may include a first light source portion 302 disposed above the first soldering region 112, and a second light source portion 304 disposed above the second soldering region 114. The first light source portion 302 may cast light toward a region A1 of an entire region A of a substrate W disposed in the first soldering region 112. The second light source portion 304 may cast light toward a different region A2 of the entire region A of a substrate W disposed in the second soldering region 114. The first light source portion 302 and the second light source portion 304 may use the same lamp, and may cast light having the same wavelength toward the substrate W. In an example embodiment, the first light source portion 302 and the second light source portion 304 may include a xenon lamp, but the present inventive concept is not necessarily limited thereto.

A shutter 1400 may include a first door 430 opening or closing a path of light cast from the first light source portion 302 to the first soldering region 112, and a second door 440 opening or closing a path of light cast from the second light source portion 304 to the second soldering region 114. Each of the first door 430 and the second door 440 may be implemented in the same configuration as the door 410, as described above, and to the extent that an element is not described in detail with respect to this figure, it may be understood that the element is at least similar to a corresponding element that has been described elsewhere within the present disclosure.

In an example embodiment, the substrate W may have a structure in which three rows of individual printed circuit board portions SW1, SW2, and SW3 including a first unit printed circuit board portion SW1, a second unit printed circuit board portion SW2, and a third unit printed circuit board portion SW3 in the transfer direction X of the transfer actuator 1200 are continuously arranged, and the individual printed circuit board portions SW1, SW2, and SW3 of each row may have may be arranged in one or multiple rows in a width direction Y, perpendicular to the transfer direction X. Various electronic components E may be disposed on the individual printed circuit board portions SW1, SW2, and SW3 of each row using a solder paste P. In this case, the first light source portion 302 may cast light toward the first unit printed circuit board portion SW1 and the second unit printed circuit board portion SW2, which may be the region A1 of the entire region A of the substrate W disposed in the first soldering region 112. The second light source portion 304 may cast light toward the third unit printed circuit board portion SW3, which may be the different region A2 of the entire region A of the substrate W disposed in the second soldering region 114.

Figure 7:
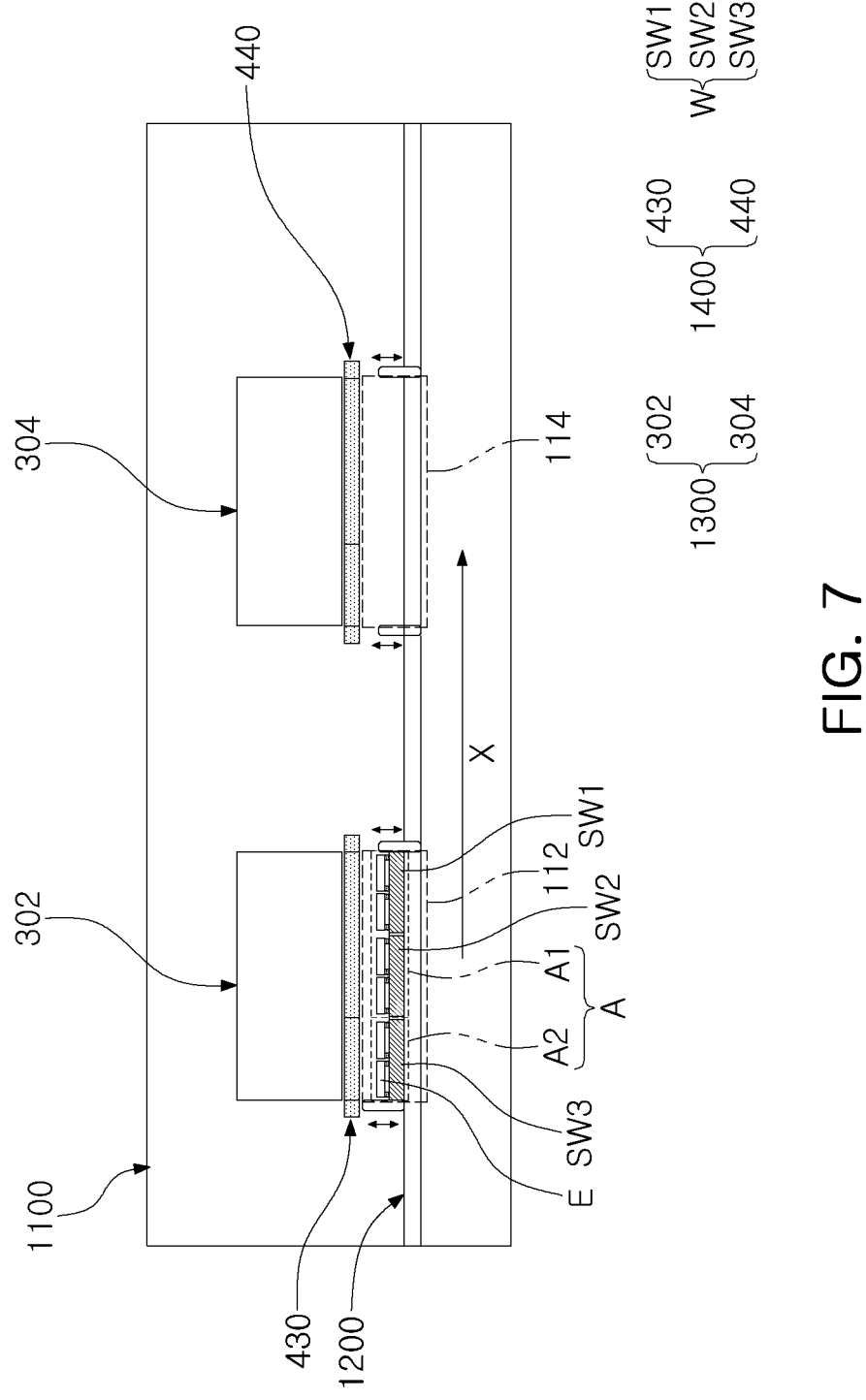
FIGS. 7 to 12 are views illustrating an operation process of the soldering apparatus of FIG. 6.
Figure 8:
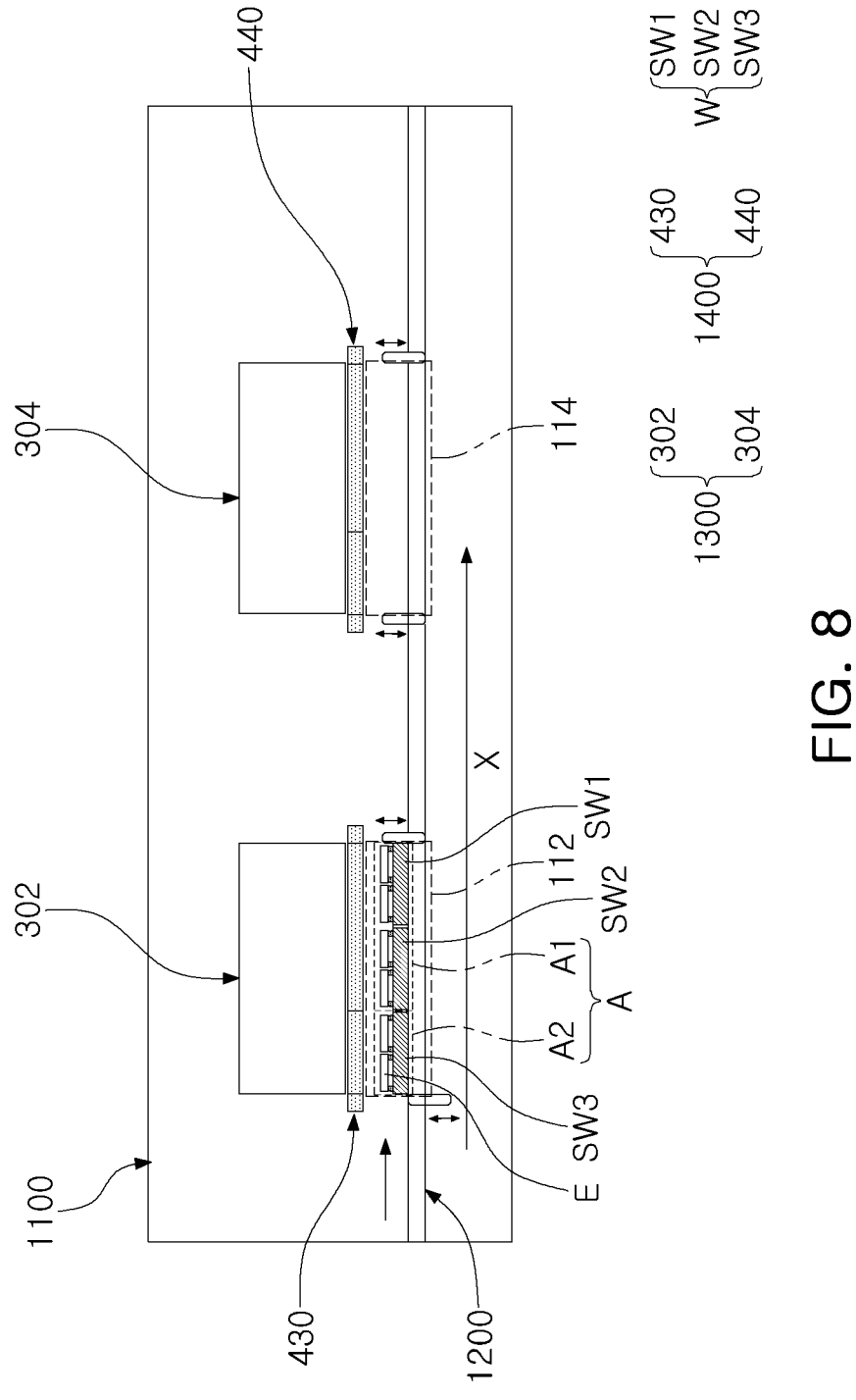
Figure 9:
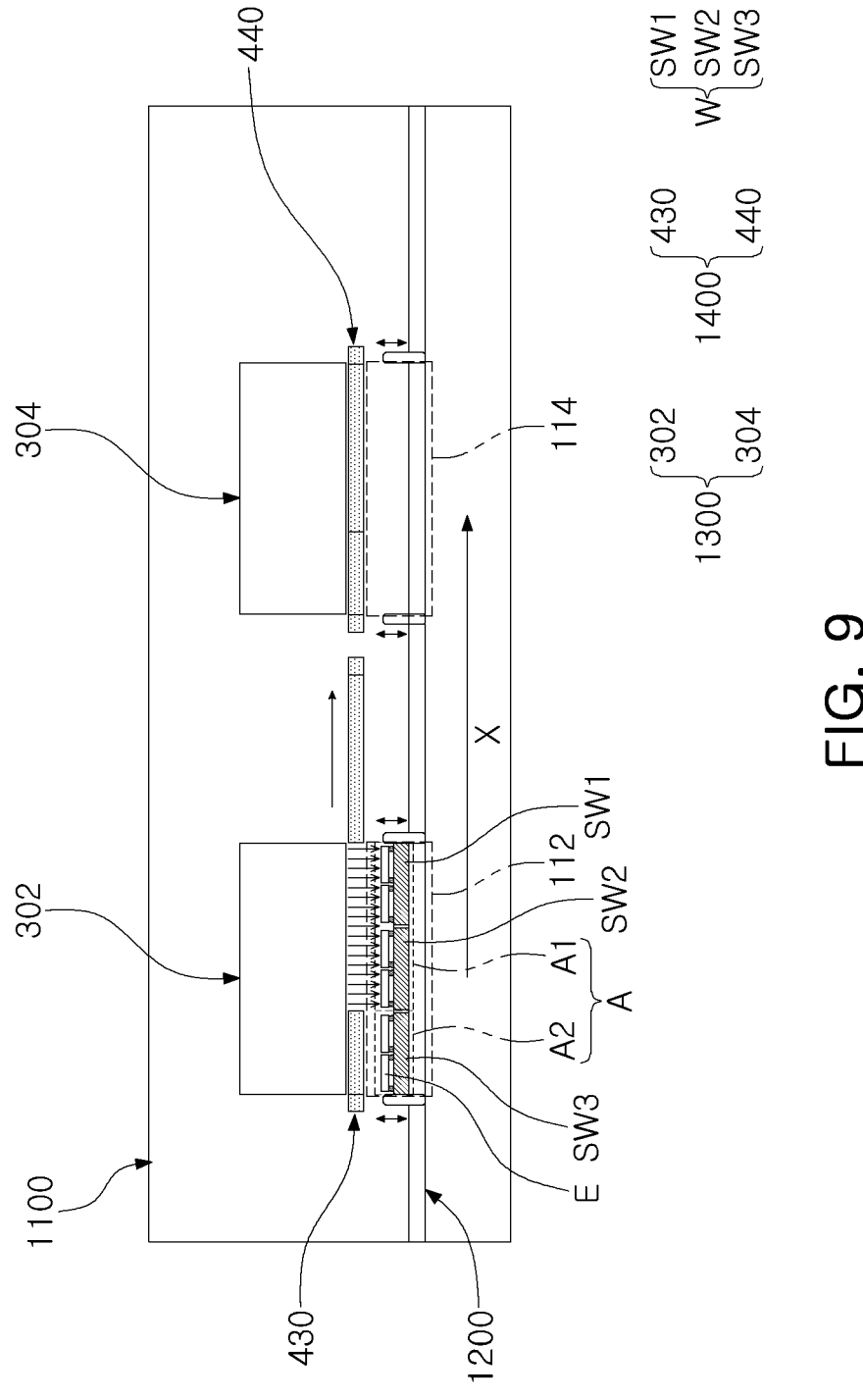
Figure 10:
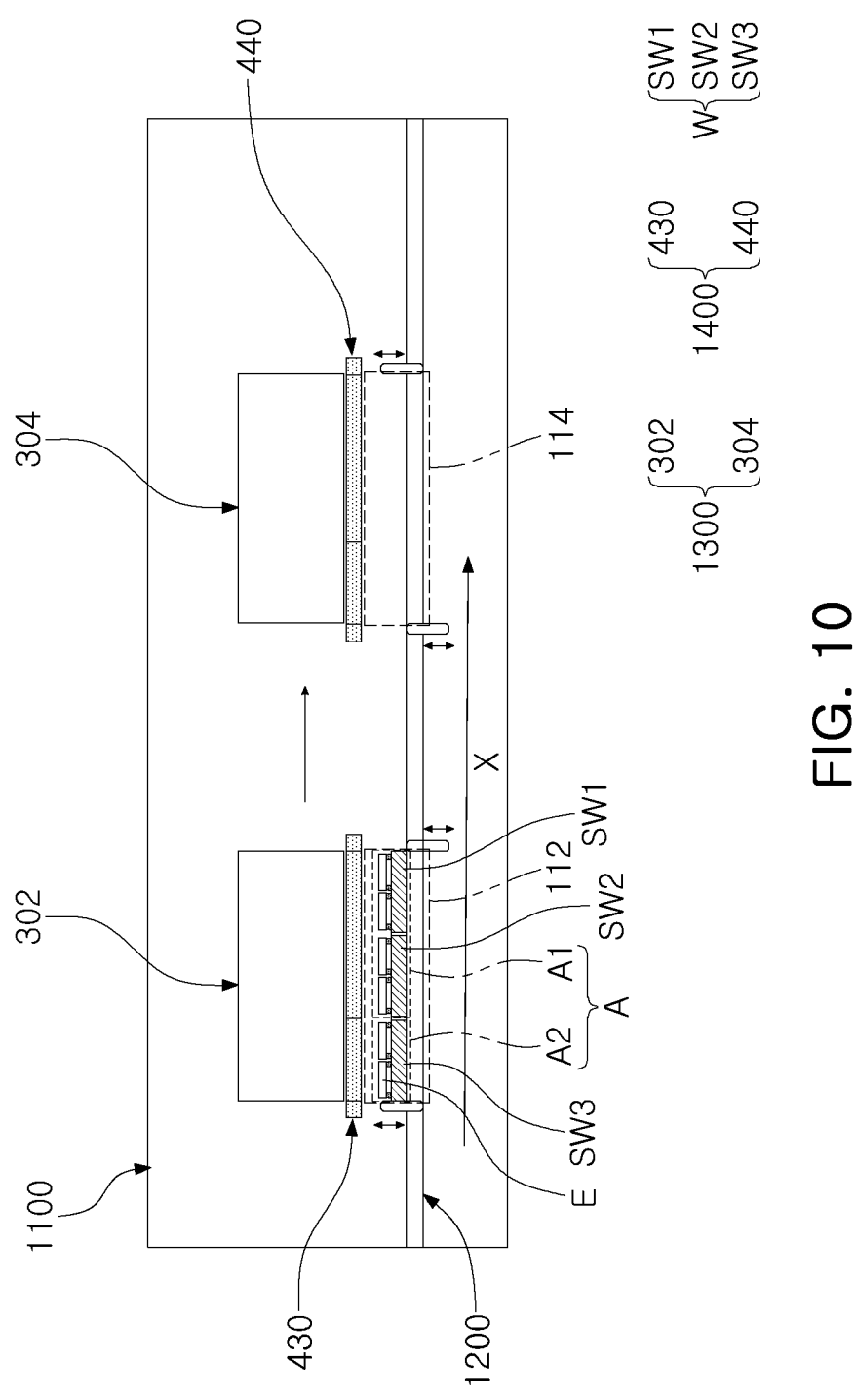
Figure 11:
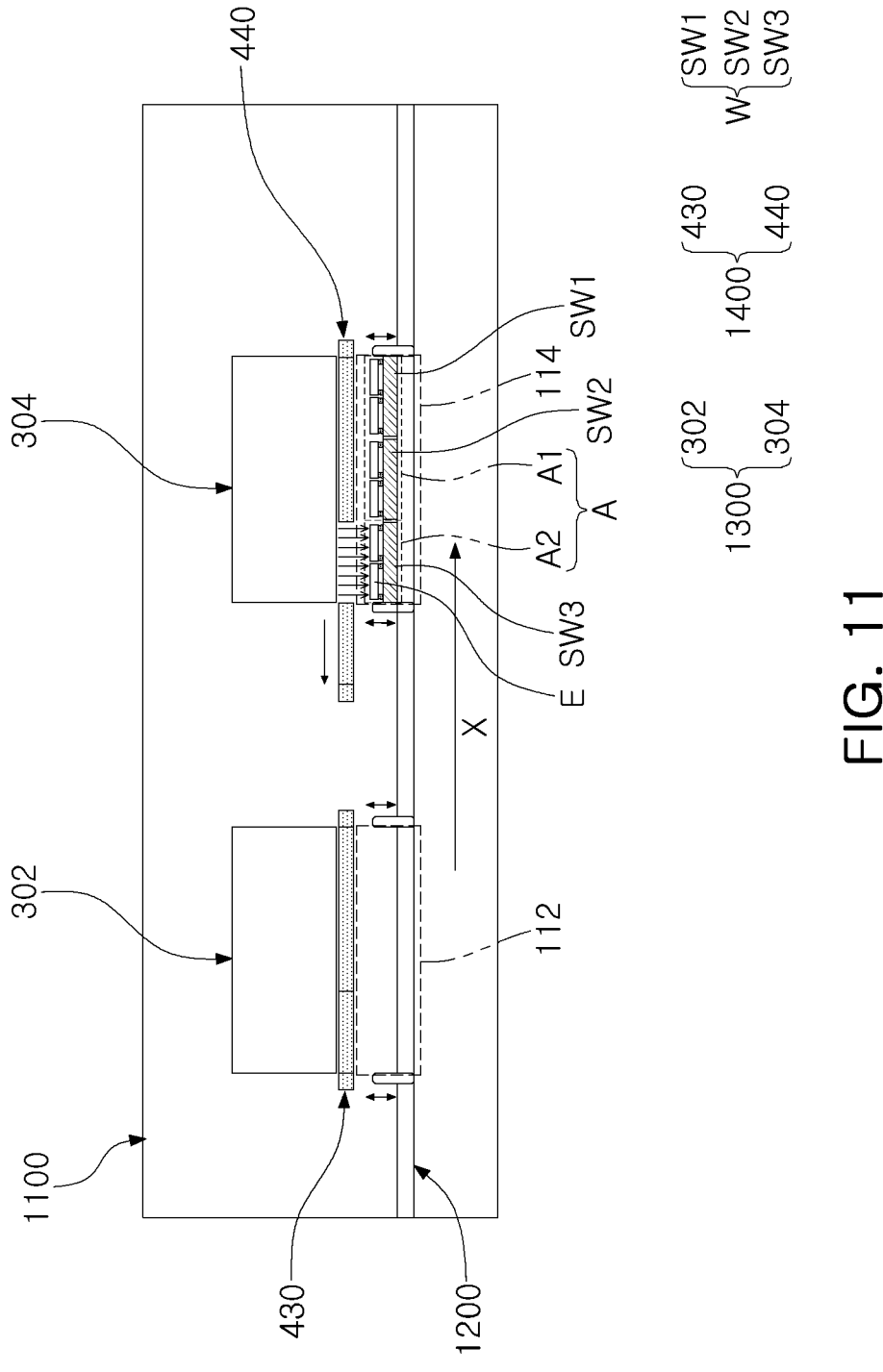
Figure 12:
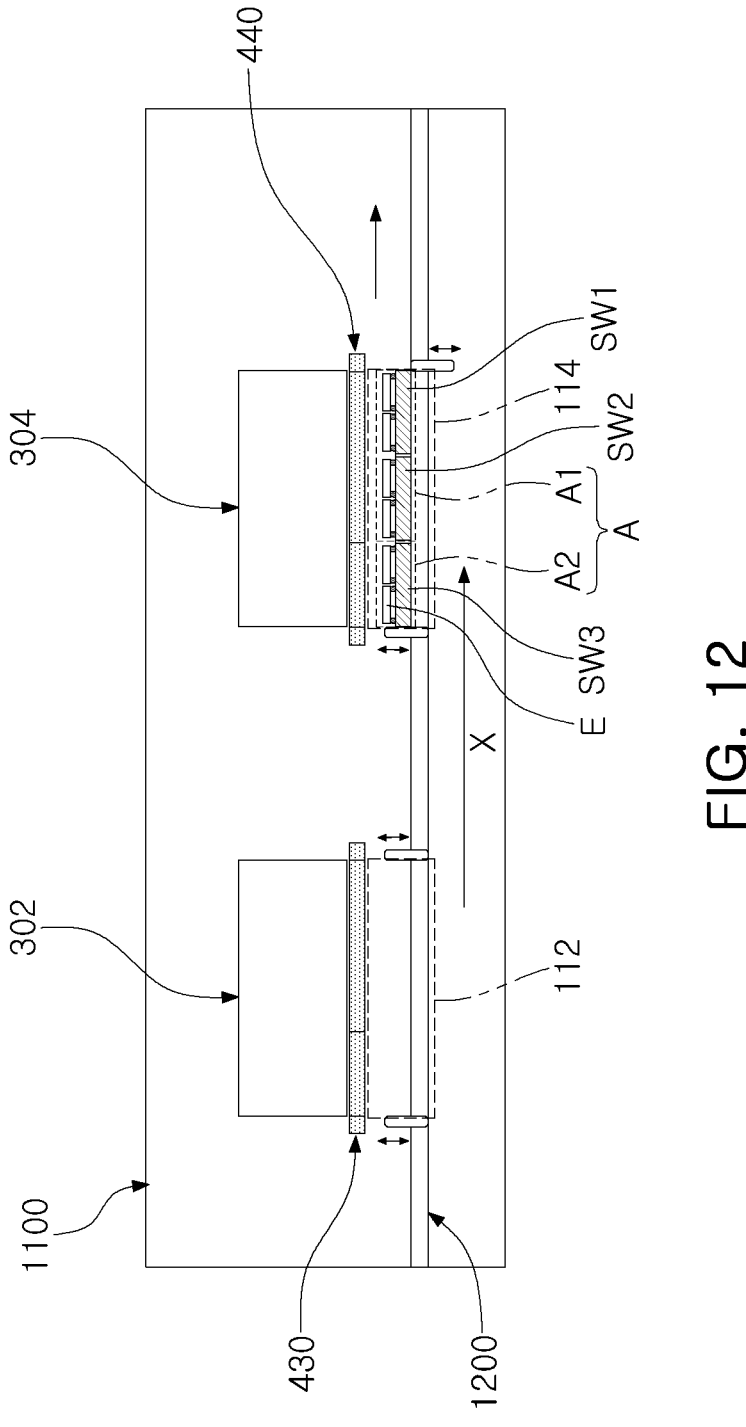

Specifically, as illustrated in FIG. 7, the substrate W may be brought into a predetermined position in the first soldering region 112 in the transfer direction X by the transfer actuator 1200. When the substrate W is brought into the predetermined position in the first soldering region 112, as illustrated in FIG. 8, the first door 430 may be opened to cast light toward the first unit printed circuit board portion SW1 and the second unit printed circuit board portion SW2, to solder the first unit printed circuit board portion SW1 and the second unit printed circuit board portion SW2 of the substrate W. Next, as illustrated in FIGS. 9 and 10, the substrate W may be transferred from the first soldering region 112 to the second soldering region 114 through the transfer actuator 1200. When the substrate W is brought into a predetermined position in the second soldering region 114, as illustrated in FIG. 11, the second door 440 may be opened to cast light toward the third unit printed circuit board portion SW3 of the substrate W through the second light source portion 304, to solder the third unit printed circuit board portion SW3 of the substrate W, and the substrate W may be then transferred from the second soldering region 114 to a different position through the transfer actuator 1200, as illustrated in FIG. 12. Therefore, even in a substrate W having a relatively large size, a soldering apparatus of the present inventive concept may be divided into a plurality of regions, and may be soldered sequentially for each of the regions, and may be thus applied to soldering processing of various substrates.

In an example embodiment, as illustrated in FIG. 6, the soldering apparatus may further include a bypass region 1130 and a transfer shuttle 1140. The bypass region 1130 may be disposed in the soldering chamber 1100, and may allow the substrate W to bypass the first soldering region 112 or the second soldering region 114, as needed, through the transfer shuttle 1140, to move the substrate W to the bypass region 1130, without soldering a corresponding region of the entire region of the substrate W. The transfer shuttle 1140 may transfer the substrate W between the first soldering region 112 and the bypass region 1130 and between the second soldering region 114 and the bypass region 1130.

Figure 13:
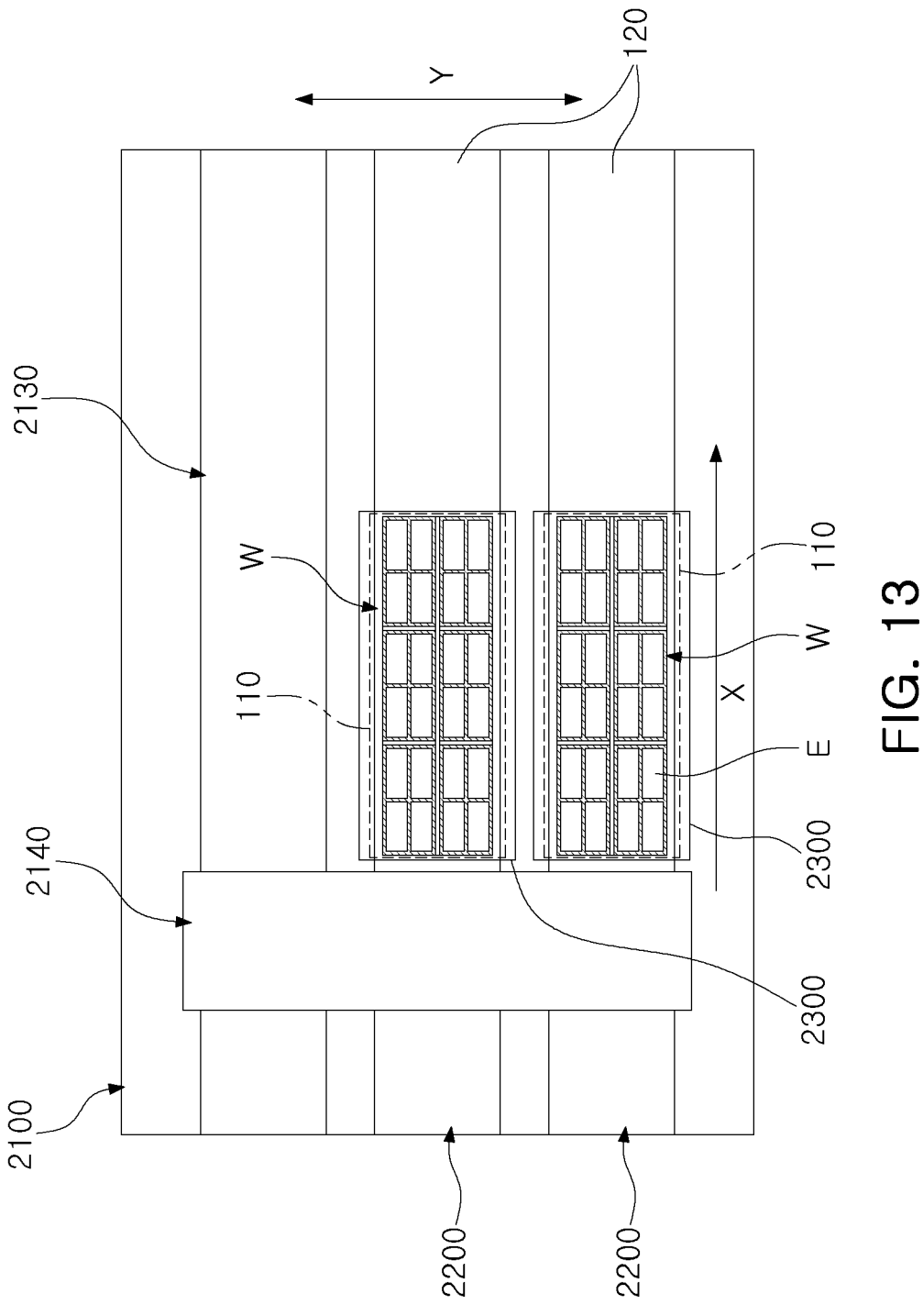
FIG. 13 is a top-down plan view of a soldering apparatus according to an example embodiment of the present inventive concept.

FIG. 13 is a top-down plan view of a soldering apparatus according to an example embodiment of the present inventive concept.

A plurality of soldering regions 110 may be disposed in a soldering chamber 2100 in a width direction Y, perpendicular to a transfer direction X, and a light source 2300 may be disposed in each of the soldering regions 110. A plurality of work lines 120 disposed in the soldering chamber 2100 in the width direction Y, perpendicular to the transfer direction X, and on which a soldering region 110 is disposed in the transfer direction X, may be arranged. As illustrated in FIG. 13, two work lines 120 may be disposed in the soldering chamber 2100. A transfer actuator 2200 may be disposed on each of the work lines 120. In this case, the soldering region 110, disposed in each of the work lines 120, and the light source 2300 may be implemented in the same configuration as the soldering region 110 and the light source 300, described above, and to the extent that an element is not described in detail with respect to this figure, it may be understood that the element is at least similar to a corresponding element that has been described elsewhere within the present disclosure.

In an example embodiment, as illustrated in FIG. 13, the soldering apparatus may further include a bypass region 2130 and a transfer shuttle 2140. The bypass region 2130 may be disposed in the soldering chamber 2100, and may allow a substrate W to bypass the soldering region 110 of each of the work lines 120, as necessary, through the transfer shuttle 2140, to move the substrate W to the bypass region 2130 without soldering. The transfer shuttle 2140 may transfer the substrate W between the soldering region 110 of each of the work lines 120, and the bypass region 2130.

According to the soldering apparatus having the above configuration, a plurality of substrates may be soldered simultaneously through a plurality of work lines 120 in which the soldering region 110 is disposed, to significantly increase soldering efficiency.

In the above, it has been described that a soldering region is disposed in each of the work lines, but the present inventive concept is not necessarily limited thereto, and a plurality of soldering regions may be arranged in each of the work lines, which will be explained below.

Figure 14:
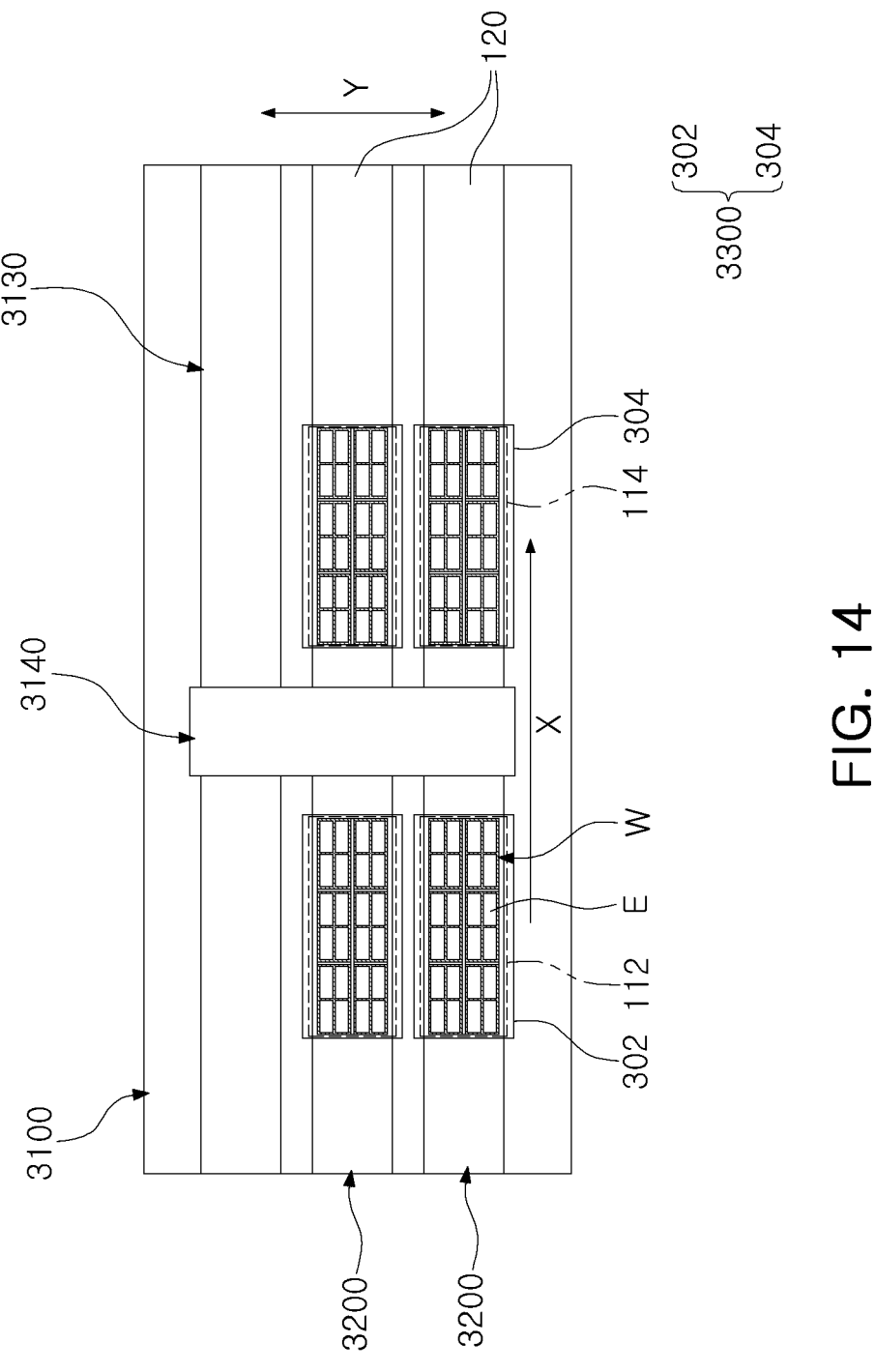
FIG. 14 is a top-down plan view of a soldering apparatus according to an example embodiment of the present inventive concept.

FIG. 14 is a top-down plan view of a soldering apparatus according to an example embodiment of the present inventive concept.

Referring to FIG. 14, a plurality of soldering regions may be disposed in a soldering chamber 3100 in a transfer direction X and a width direction Y of a transfer actuator 3200, and a light source 3300 may be disposed in each of the soldering regions. A plurality of work lines 120 may be disposed in the soldering chamber 3100, each of the work lines 120 may include a plurality of soldering regions, and the light source 3300 may be disposed in each of the soldering regions. In the example embodiment, as illustrated in FIG. 14, two work lines 120 may be disposed in the soldering chamber 3100, each of the work lines 120 may include two soldering regions including a first soldering region 112 and a second soldering region 114, and the light source 3300 may be disposed in the first soldering region 112 and the second soldering region 114, respectively. For example, as described in example embodiment 2 above, two work lines 120 provided with the first soldering region 112, a first light irradiation portion 302 disposed in the first soldering region 112, the second soldering region 114, and a second light irradiation portion 304 disposed in the second soldering region 114 may be arranged in the width direction Y, as illustrated in FIG. 13.

In an example embodiment, as illustrated in FIG. 14, the soldering apparatus may further include a bypass region 3130 and a transfer shuttle 3140. The bypass region 3130 may be disposed in the soldering chamber 3100, and may allow a substrate W to bypass the first soldering region 112 and the second soldering region 114 of each of the work lines 120, as necessary, through the transfer shuttle 3140, to move the substrate W to the bypass region 3130, without soldering a corresponding region of the entire region of the substrate W. The transfer shuttle 3140 may transfer the substrate W between the first soldering region 112 of each of the work lines 120 and the bypass region 3130 and between the second soldering region 114 of each of the work lines 120 and the bypass region 3130.

According to the soldering apparatus having the above configuration, a plurality of substrates may be soldered simultaneously through a plurality of work lines 120 in which the first soldering region 112 and the second soldering region 114 may be arranged in the soldering chamber 3100, to significantly increase soldering efficiency.

In the above example embodiments, the soldering apparatus provided with one soldering chamber has been described, but the present inventive concept is not necessarily limited thereto, and the soldering apparatus may be provided with a plurality of soldering chambers, which may be described in detail below.

Figure 15:
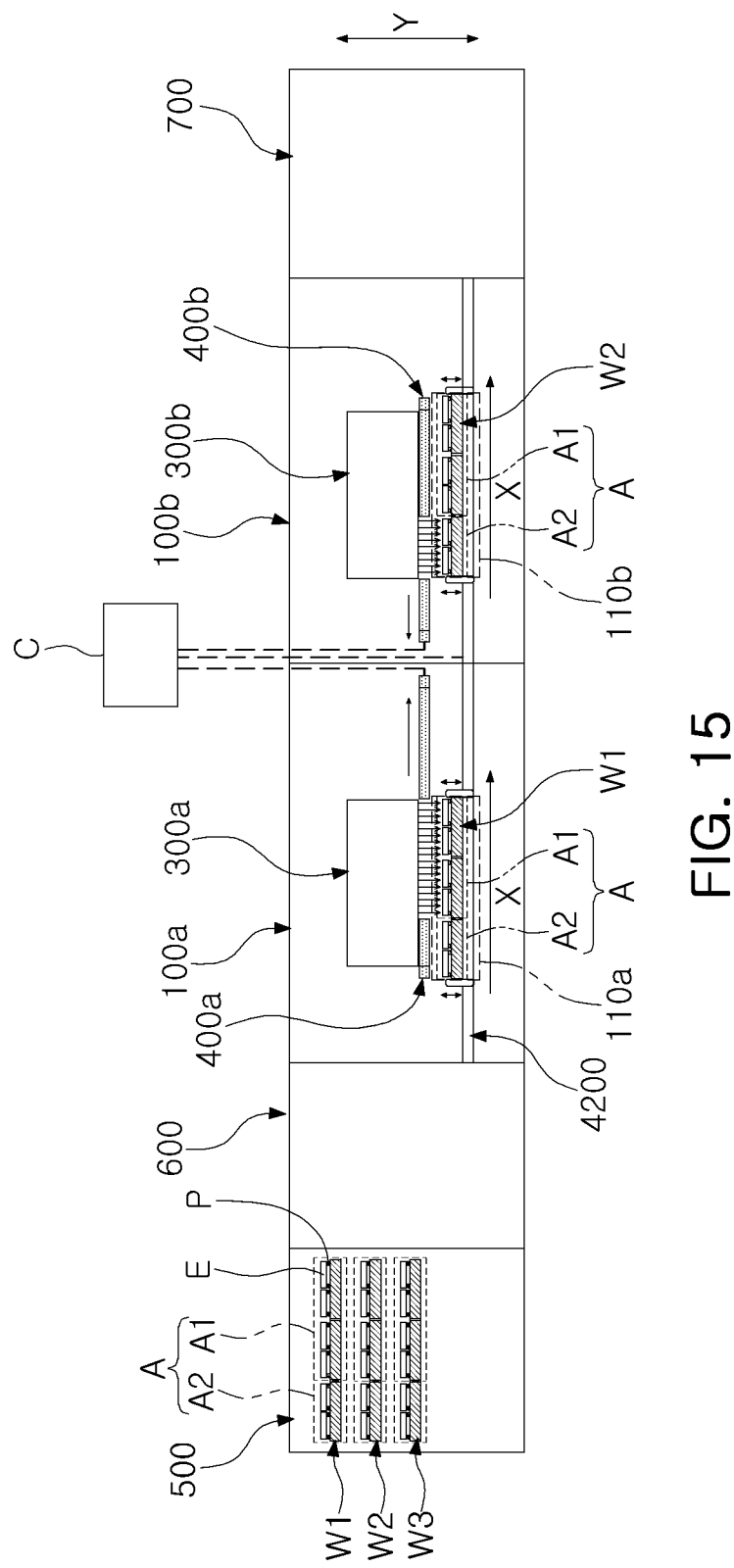
FIG. 15 is a view illustrating a soldering apparatus according to an example embodiment of the present inventive concept.
Figure 16:
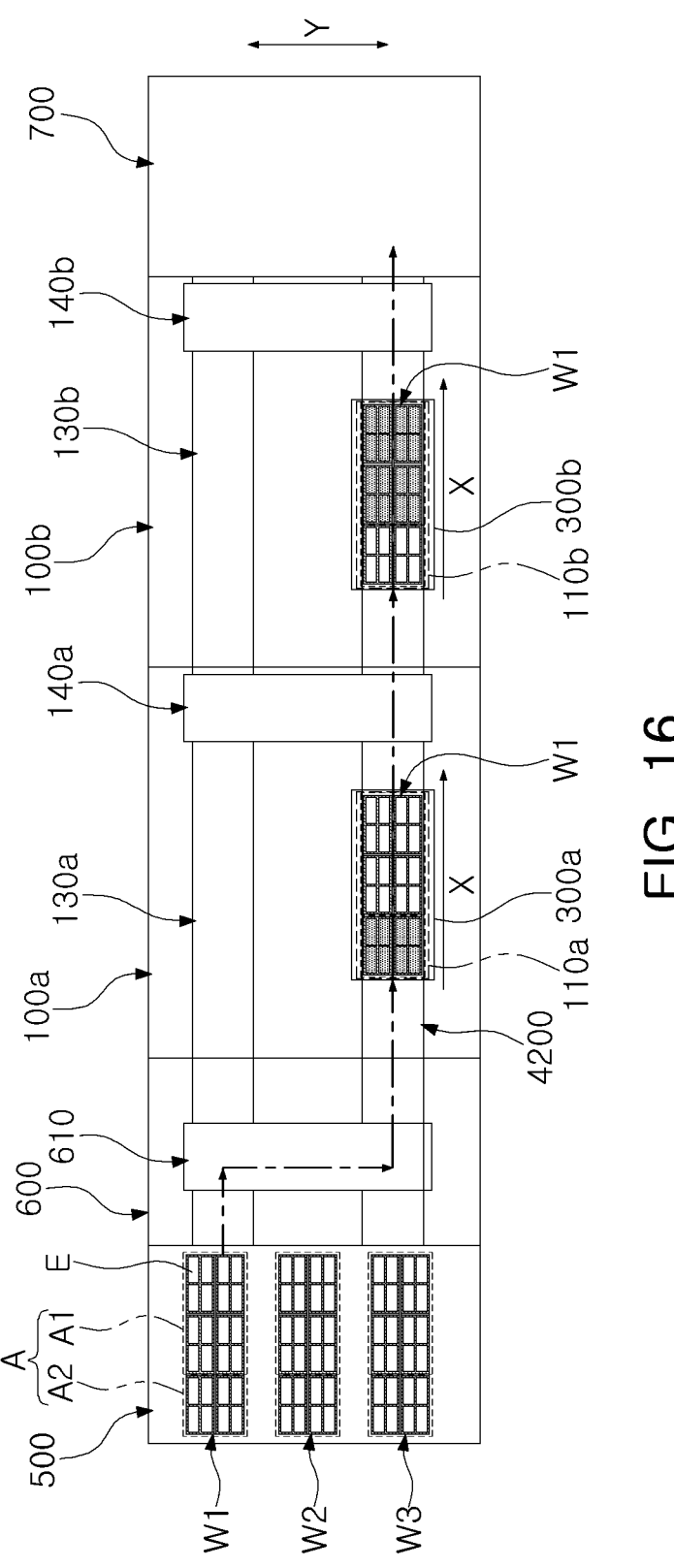
FIG. 16 is a plan view illustrating an operation process of a soldering apparatus according to an example embodiment of the present inventive concept.
Figure 17:
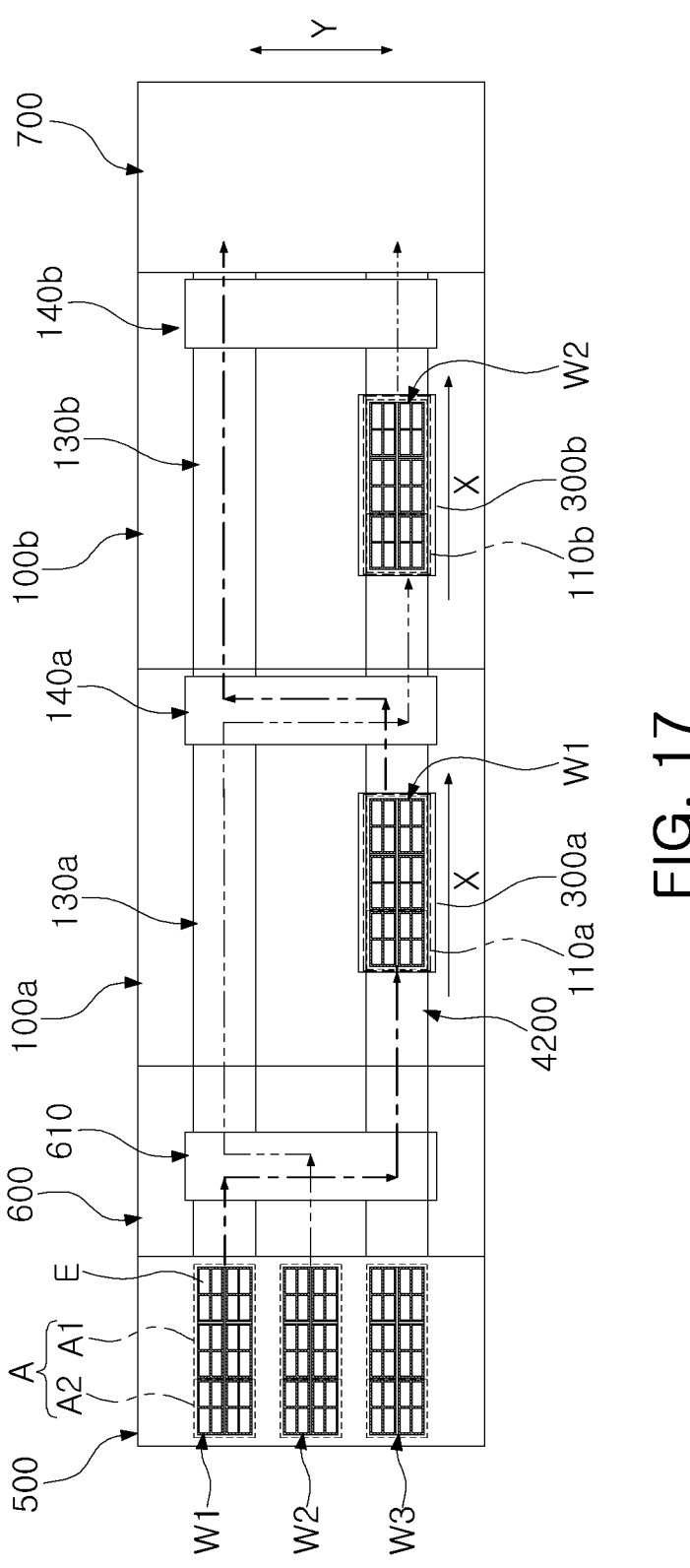
FIG. 17 is a plan view illustrating an operation process of a soldering apparatus according to an example embodiment of the present inventive concept.

FIG. 15 is a view illustrating a soldering apparatus according to an example embodiment of the present inventive concept, FIG. 16 is a plan view illustrating an operation process of a soldering apparatus according to an example embodiment of the present inventive concept, and FIG. 17 is a plan view illustrating an operation process of a soldering apparatus according to an example embodiment of the present inventive concept.

Referring to FIGS. 15 to 17, a soldering apparatus, according to an example embodiment of the present inventive concept may include a load chamber 500, a first soldering chamber 100*a*, a second soldering chamber 100*b*, a buffer chamber 600, an unload chamber 700, a transfer actuator 4200, a first light source 300*a*, a second light source 300*b*, a first shutter 400*a*, a second shutter 400*b*, and a controller C.

A plurality of substrates W1, W2, and W3 may be loaded into the load chamber 500. In an example embodiment, as illustrated in FIGS. 15 to 17, a first substrate W1, a second substrate W2, and a third substrate W3 may be disposed in the load chamber 500.

As illustrated in FIGS. 15 to 17, the first soldering chamber 100*a* may have a first soldering region 110*a*, and the second soldering chamber 100*b* may have a second soldering region 110*b*. The buffer chamber 600 may be disposed between the first soldering chamber 100*a* and the load chamber 500. The second soldering chamber 100*b* may be adjacent to the first soldering chamber 100*a*.

The buffer chamber 600 may be disposed between the load chamber 500 and the first soldering chamber 100*a*. A main shuttle 610 may be disposed in the buffer chamber 600 to transfer the first to third substrates W1, W2, and W3 in the load chamber 500 to the first soldering chamber 100*a*.

The unload chamber 700 may unload the first to third substrates W1, W2, and W3 from the first soldering chamber 100*a* or the second soldering chamber 100*b*. The first to third substrates W1, W2, and W3 that have been soldered through the first soldering chamber 100*a* or the second soldering chamber 100*b* may be unloaded into the unload chamber 700, and may be collected in the unload chamber 700.

The transfer actuator 4200 may be disposed in the first soldering chamber 100*a* and the second soldering chamber 100*b*, and may pass through the first soldering region 110*a* and the second soldering region 110*b*. The transfer actuator 4200 may introduce the first to third substrates W1, W2, and W3 on which an electronic component E is disposed by a solder paste P in a transfer direction X into and out of the first soldering chamber 100*a* and the second soldering chamber 100*b*. The transfer actuator 4200 may have the same configuration as the transfer actuator 200 described above, and to the extent that an element is not described in detail with respect to this figure, it may be understood that the element is at least similar to a corresponding element that has been described elsewhere within the present disclosure.

The first light source 300*a* may be disposed in the first soldering chamber 100*a*, and may cast first light toward the first soldering region 110*a*. The second light source 300*b* may be disposed in the second soldering chamber 100*b*, and may cast second light toward the second soldering region 110*b*. Each of the first light source 300*a* and the second light source 300*b* may use the same lamp and, in an example embodiment, may include a xenon lamp.

In this case, the first light source 300*a* and the second light source 300*b* may cast at least a portion of an entire region of the substrate depending on sizes of the first to third substrates W1, W2, and W3. In an example embodiment, when the first to third substrates W1, W2, and W3 have relatively large sizes, the first soldering region 110*a* and the second soldering region 110*b* may be sequentially soldered for each preset region through the first light source 300*a* and the second light source 300*b*, as illustrated in FIG. 16. In this case, the first light source 300*a* may have a first range covering a region A1 of an entire region A of the first to third substrates W1, W2, and W3. The second light source 300*b* may have a second range covering a different region A2 of the entire region A of the first to third substrates W1, W2, and W3.

The first shutter 400*a* may be disposed between the first soldering region 110*a* and the first light source 300*a* in the first soldering chamber 100*a*, and may open or close a path of the first light cast from the first light source 300*a* toward the first soldering region 110*a*. The second shutter 400*b* may be disposed between the second soldering region 110*b* and the second light source 300*b* in the second soldering chamber 100*b*, and may open or close a path of the second light cast from the second light source 300*b* toward the second soldering region 110*b*.

The controller C may be connected to the transfer actuator 4200, the first shutter 400*a*, and the second shutter 400*b*, and may control an opening or closing operation of the first shutter 400*a* and the second shutter 400*b*. In an example embodiment, when the first to third substrates W1, W2, and W3 have relatively large sizes, which might not be soldered, the entire region of the first to third substrates W1, W2, and W3 in the first soldering chamber 100*a* or the second soldering chamber 100*b*, the controller C may control to pass through the first to third substrates W1, W2, and W3 in the first soldering region 110*a* and the second soldering region 110*b* sequentially. When the first to third substrates W1, W2, and W3 are brought into a predetermined position in the first soldering region 110*a*, the controller C may open the first shutter 400*a* to cast the first light to the region A1 of the entire region A of the first to third substrates W1, W2, and W3 through the first light source 300*a*, and may then close the first shutter 400*a*. In addition, when the first to third substrates W1, W2, and W3 are brought into a predetermined position in the second soldering region 110*b*, the controller C may open the second shutter 400*b* to cast the second light to the different region A2 of the entire region A of the first to third substrates W1, W2, and W3 through the light source 300*b*, and may then close the second shutter 400*b*.

In the above, even though a method of sequentially soldering each region through the first light source 300*a* and the second light source 300*b* while selectively passing through one of 110*a* and the second soldering region 110*b* with respect to the first to third substrates W1, W2, and W3 has been described, in the first to third substrates W1, W2, and W3 having a relatively small size capable of covering the entire region of the first to third substrates W1, W2, and W3, the entire region of the substrate may be soldered while selectively passing through one of the first soldering region 110*a* of the first soldering chamber 100*a* or the second soldering region 110*b* of the second soldering chamber 100*b*.

To implement this, in an example embodiment, the soldering apparatus also may include a first bypass region 130*a*, a first transfer shuttle 140*a*, a second bypass region 130*b*, and a second transfer shuttle 140*b*.

The first bypass region 130*a* may be disposed in the first soldering chamber 100*a*, and the first to third substrates W1, W2, and W3 may bypass the first soldering region 110*a*.

The first transfer shuttle 140*a* may transfer the first to third substrates W1, W2, and W3 between the first soldering region 110*a* and the first bypass region 130*a*.

The second bypass region 130*b* may be disposed in the second soldering chamber 100*b*, and the first to third substrates W1, W2, and W3 may bypass the second soldering region 110*b*.

The second transfer shuttle 140*b* may transfer the first to third substrates W1, W2, and W3 between the second soldering region 110*b* and the second bypass region 130*b*.

In an example embodiment, as illustrated in FIG. 17, the controller C may control the first to third substrates W1, W2, and W3 to pass sequentially through the first soldering region 110*a* and the second bypass region 130*b*, or pass sequentially through the first bypass region 130*a* and the second soldering region 110*b*, when a range of the first light cast from the first light source 300*a* and the second light cast from the second light source 300*b* cover an entire region of the first to third substrates W1, W2, and W3. For example, as illustrated in FIG. 17, the controller C may control an operation of the transfer actuator 4200 and an operation of the second transfer shuttle 140*b*, to sequentially pass the first substrate W1 through the first soldering region 110*a* in the first soldering chamber 100*a* and the second bypass region 130*b* in the second soldering chamber 100*b*. Therefore, soldering may be performed by casting the first light from the first soldering region 110*a* in the first soldering chamber 100*a* toward the entire region of the first substrate W1 through the first light source 300*a*, and the soldered first substrate W1 may be unloaded into the unload chamber 700 by passing through the second bypass region 130*b* in the second soldering chamber 100*b*. In addition, the controller C may control an operation of the first transfer shuttle 140*a* and an operation of the transfer actuator 4200 during the soldering process for the first substrate W1, before or after the soldering process, to sequentially pass the second substrate W2 through the first bypass region 130*a* in the first soldering chamber 100*a* and the second soldering region 110*b* in the second soldering chamber 100*b*. Therefore, the second substrate W2 may pass through the first bypass region 130*a* in the first soldering chamber 100*a*, may move into the second soldering chamber 100*b* without soldering in the first soldering region 110*a*, may be soldered by casting the second light from the second soldering region 110*b* toward the entire region of the second substrate W2 through the second light source 300*b*, and may be then unloaded into the unload chamber 700. A soldering process for the third substrate W3 may be applied in the same manner as the soldering process for the first or second substrate W1 or W2.

Therefore, depending on sizes of substrates to be soldered, the substrates may be soldered by selectively or sequentially passing through the first soldering region 110*a* of the first soldering chamber 100*a* or the second soldering region 110*b* of the second soldering chamber 100*b*, and may be thus soldered in a suitable manner for substrates of various sizes.

In the present embodiment, the soldering apparatus may be described as being provided with two soldering chambers including the first soldering chamber 100*a* and the second soldering chamber 100*b*, but the present inventive concept is not necessarily limited thereto, and may include a soldering chamber or two or more soldering chambers, as in an example embodiment described above.

Figure 18:
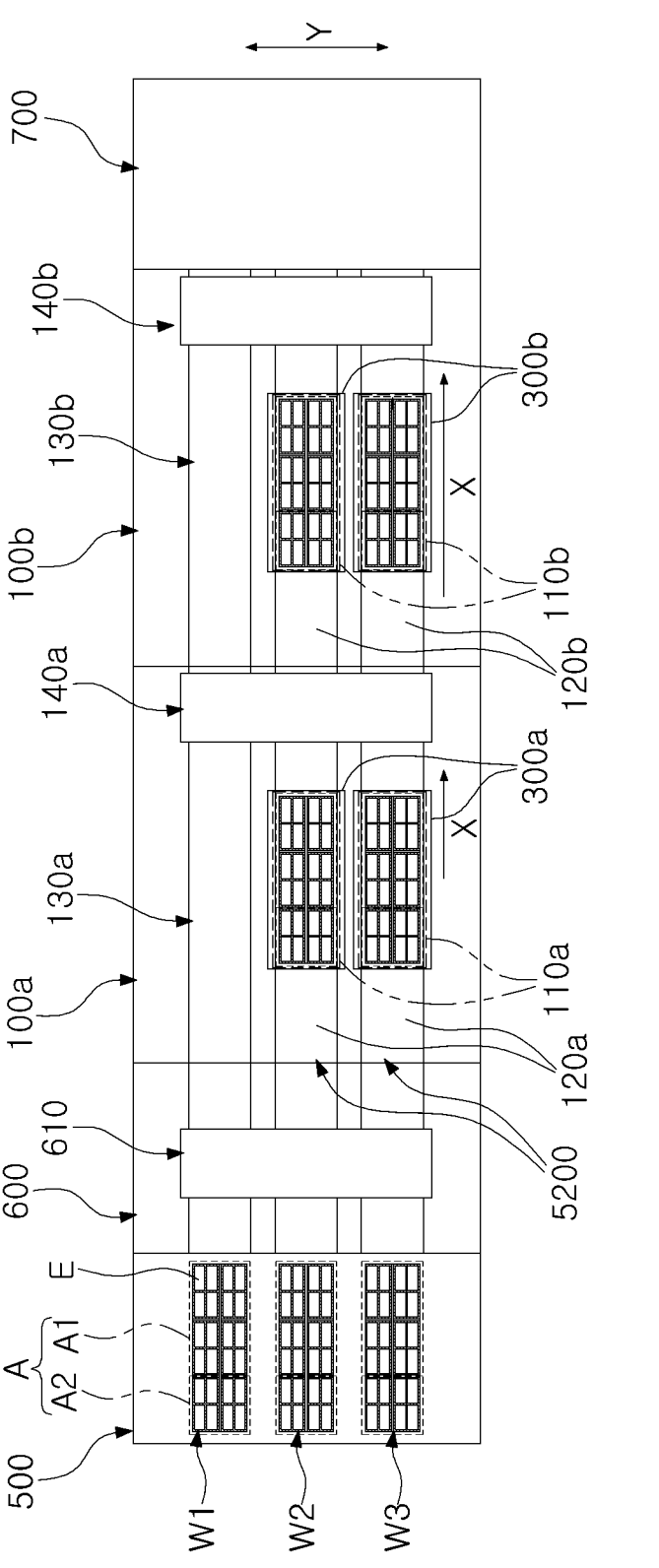
FIG. 18 is a plan view illustrating an operation process of a soldering apparatus according to an example embodiment of the present inventive concept.

FIG. 18 is a plan view illustrating an operation process of a soldering apparatus according to an example embodiment of the present inventive concept.

A soldering apparatus, according to an example embodiment of the present inventive concept, may include a first soldering chamber 100*a* having a plurality of first work lines 120*a* disposed therein, and a second soldering chamber 100*b* having a plurality of second work lines 120*b* disposed therein.

In an example embodiment, as illustrated in FIG. 18, two first work lines 120*a* arranged side by side in a width direction Y, perpendicular to a transfer direction X, and on which a first soldering region 110*a* is disposed in the transfer direction X may be arranged in the first soldering chamber 100*a*, and a transfer actuator 5200 may be disposed on each of the first work lines 120*a*.

Two second work lines 120*b* arranged side by side in the width direction Y, perpendicular to the transfer direction X, and on which a second soldering region 110*b* is disposed in the transfer direction X may be arranged in the second soldering chamber 100*b*, and the transfer actuator 5200 may be disposed in each of the second work lines 120*b*.

For example, the first soldering chamber 100*a* and the second soldering chamber 100*b* may be implemented, respectively, in the same configuration as the soldering chamber 2100 described in example embodiment 3 above.

The present inventive concept is not necessarily limited thereto, and the first soldering chamber and the second soldering chamber may be implemented, respectively, in the same configuration as any one of the soldering chambers of the example embodiments described above.

In the above embodiments, the shutter has been described as a separate component disposed between the light source and the soldering region in the soldering chamber, but the present inventive concept is not necessarily limited thereto, and may be implemented in various forms or methods as long as there is a configuration that blocks a path of light irradiated from the light source to the soldering region. An example embodiment may be implemented as a partial configuration of a light source, and of course, may also be implemented as a screen that blocks light.

The present inventive concept may provide a soldering apparatus for preventing occurrence of soldering defects to a substrate.

In addition, the present inventive concept may provide a soldering apparatus for minimizing a temperature gradient during soldering and securing reliability of a substrate by irradiating light to the substrate.

Various aspects and effects of the present inventive concept are not necessarily limited to the above-described contents, and can be more easily understood through description of specific embodiments of the present inventive concept.

While example embodiments have been illustrated and described above, it will be apparent to those skilled in the art that modifications and variations could be made without departing from the scope of the present disclosure.

What is claimed is:

1. A soldering apparatus, comprising:
a soldering chamber having a soldering region defined therein;
a transfer actuator disposed within the soldering region, the transfer actuator being configured to move a substrate on which an electronic component is disposed into and out of the soldering region;
a light source disposed within the soldering chamber, the light source configured to cast light toward the soldering region;
a shutter disposed between the soldering region and the light source in the soldering chamber, the shutter movable in the soldering chamber and configured to open and close a path of the light of the light source that is cast toward the soldering region; and
a controller connected to the transfer actuator and the shutter, the controller configured to control an opening and closing operation of the shutter.

2. The soldering apparatus of claim 1, wherein the light source has range spanning an entire region of the substrate.

3. The soldering apparatus of claim 2, wherein the shutter comprises a door having an open position for opening the path of the light and a closed position for blocking the irradiation path of the light, and a driver connected to the controller and moving the door between the open position and the closed position.

4. The soldering apparatus of claim 3, wherein the controller brings the door into the open position when the substrate is in a predetermined position in the soldering region, and brings the door in the closed position when the substrate is not in the predetermined position in the soldering region.

5. The soldering apparatus of claim 1, wherein the soldering chamber has a plurality of soldering regions, and the light source is disposed in each of the plurality of soldering regions.

6. The soldering apparatus of claim 5, wherein the soldering chamber comprises a first soldering region and a second soldering region, arranged in a direction in which the transfer actuator is configured to move,
wherein the light source comprises a first light source disposed above the first soldering region and configured to cast light toward a first region of the substrate, and a second light source disposed above the second soldering region and configured to cast light toward a second region of the substrate, and
wherein the shutter comprises a first door configured to open and close a path of light cast from the first light source to the first soldering region, and a second door configured to open and close a path of light cast from the second light source to the second soldering region.

7. The soldering apparatus of claim 1, wherein the shutter comprises a first shutter configured to open and close a first light path toward a first region of the substrate, in the path of the light cast from the light source, and a second shutter configured to opening and closing a second light path toward a second region of the substrate, in the path of the light cast from the light source, and
wherein the controller is configured to open one of the first shutter and the second shutter, and closes the other thereof.

8. The soldering apparatus of claim 1, wherein a plurality of work lines arranged in a width direction, perpendicular to a direction in which the transfer actuator is configured to move, and on which at least one soldering region is disposed, are arranged in the soldering chamber, and the transfer actuator is disposed in each of the plurality of work lines.

9. The soldering apparatus of claim 1, further comprising a bypass region disposed in the soldering chamber and configured to allow the substrate to bypass the soldering region, and a transfer shuttle configured to transfer the substrate between the soldering region and the bypass region.

10. The soldering apparatus of claim 1, wherein the light source comprises a xenon lamp.

11. The soldering apparatus of claim 1, wherein the transfer actuator comprises a stopper contacting one side of the substrate or releasing contact with the one side of the substrate, and configured to bring the substrate in a predetermined position or release the substrate from the predetermined position in the soldering region.

12. A soldering apparatus, comprising:
a first soldering chamber having a first soldering region;
a second soldering chamber disposed adjacent to the first soldering chamber and having a second soldering region;
a transfer actuator disposed within the first soldering region and the second soldering region, the transfer actuator being configured to move a substrate on which an electronic component is disposed into and out of the first soldering region and the second soldering region;
a first light source disposed in the first soldering chamber and configured to cast first light toward the first soldering region;
a second light source disposed in the second soldering chamber and configured to cast second light toward the second soldering region;

a first shutter disposed between the first soldering region and the first light source in the first soldering chamber and movable in the first soldering chamber, and configured to open and close a light path of the first light of the first light source toward the first soldering region;

a second shutter disposed between the second soldering region and the second light source in the second soldering chamber and movable in the second soldering chamber, and configured to open and close a light path of the second light of the second light source toward the second soldering region; and a controller connected to the transfer actuator, the first shutter, and the second shutter, and configured to control an opening and closing operation of the first shutter and an opening and closing operation of the second shutter.

13. The soldering apparatus of claim 12, wherein, when the substrate is in a predetermined position in the first soldering region, the controller opens the first shutter to cast the first light of the first light source to the substrate, and closes the first shutter, and when the substrate is in a predetermined position in the second soldering region, the controller opens the second shutter to cast the second light of the second light source to the substrate, and closes the second shutter.

14. The soldering apparatus of claim 13, wherein the first light source has a first range, and the second light source has a second range, and wherein the controller allows the substrate to sequentially pass through the first soldering region and the second soldering region.

15. The soldering apparatus of claim 12, further comprising:

a first bypass region disposed in the first soldering chamber and allowing the substrate to bypass the first soldering region;

a first transfer shuttle transferring the substrate between the first soldering region and the first bypass region;

a second bypass region disposed in the second soldering chamber and allowing the substrate to bypass the second soldering region; and a second transfer shuttle transferring the substrate between the second soldering region and the second bypass region.

16. The soldering apparatus of claim 15, wherein the controller controls the substrate to pass sequentially through the first soldering region and the second bypass region, or pass sequentially through the first bypass region and the second soldering region, when a range of the first light of the first light source and the second light of the second light source cover an entire region of the substrate.

17. The soldering apparatus of claim 12, wherein a plurality of first work lines arranged side by side in a width direction, perpendicular to a direction in which the transfer actuator is configured to move, and on which at least one first soldering region is disposed in the direction in which the transfer actuator is configured to move, are arranged in the first soldering chamber, and the transfer actuator is disposed in each of the plurality of first work lines.

18. The soldering apparatus of claim 12, wherein a plurality of second work lines arranged side by side in a width direction, perpendicular to a direction in which the transfer actuator is configured to move, and on which at least one second soldering region is disposed in the direction in which the transfer actuator is configured to move, are arranged in the second soldering chamber, and the transfer actuator is disposed in each of the plurality of second work lines.

19. The soldering apparatus of claim 12, wherein the first light source and the second light source each comprises a xenon lamp.

20. A soldering apparatus, comprising:

a load chamber in which a plurality of substrates on which an electronic component is disposed are loaded;

at least one soldering chamber having a soldering region;

a buffer chamber disposed between the load chamber and the soldering chamber and in which a main shuttle configured to transfer each of the plurality of substrates in the load chamber to the soldering chamber is disposed;

an unload chamber configured to unload each of the plurality of substrates from the soldering chamber;

a transfer actuator disposed in the soldering chamber, disposed within the soldering region, the transfer actuator being configured to move each of the plurality of substrates into and out of the soldering region in a transfer direction;

a light source disposed in the soldering chamber and casting light toward the soldering region;

a shutter disposed between the soldering region and the light source in the at least one soldering chamber and movable in the at least one soldering chamber and configured to open and close a path of the light cast from the light source toward the soldering region; and a controller connected to the transfer actuator and the shutter and configured to control an opening and closing operation of the shutter.

* * * * *